(12) United States Patent
Wan

(10) Patent No.: US 11,979,051 B2
(45) Date of Patent: May 7, 2024

(54) WIRELESS CHARGING METHODS AND DEVICE TO-BE-CHARGED

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 354 days.

(21) Appl. No.: 17/341,932

(22) Filed: Jun. 8, 2021

(65) Prior Publication Data

US 2021/0296923 A1    Sep. 23, 2021

Related U.S. Application Data

(63) Continuation of application No. PCT/CN2018/122654, filed on Dec. 21, 2018.

(51) Int. Cl.
*H02J 7/02* (2016.01)
*H02J 7/00* (2006.01)
(Continued)

(52) U.S. Cl.
CPC .......... *H02J 7/02* (2013.01); *H02J 7/00032* (2020.01); *H02J 7/0047* (2013.01);
(Continued)

(58) Field of Classification Search
CPC ........ H02J 7/02; H02J 7/00032; H02J 7/0047; H02J 7/00714; H02J 7/007182;
(Continued)

(56) References Cited

U.S. PATENT DOCUMENTS

| 2012/0306287 A1* | 12/2012 | Kim | .......... H02J 50/12 |
| | | | 307/104 |
| 2016/0118805 A1* | 4/2016 | Swope | .......... H02J 50/80 |
| | | | 307/104 |

(Continued)

FOREIGN PATENT DOCUMENTS

| CN | 101980412 | 2/2011 |
| CN | 103840528 | 6/2014 |

(Continued)

OTHER PUBLICATIONS

EPO, Communication for EP Application No. 18943819.5, dated Jun. 28, 2022.

(Continued)

*Primary Examiner* — Stacy Whitmore
(74) *Attorney, Agent, or Firm* — Hodgson Russ LLP

(57) ABSTRACT

Wireless charging methods, a device to-be-charged (230), a power supply device (210), and a storage medium are provided. A wireless charging method is applicable to a device to-be-charged (230). The device to-be-charged (230) includes a wireless power receiving circuit. The method include the following. During wireless charging, an output current of the wireless power receiving circuit and a charging voltage of a battery and/or a charging current of the battery are detected (101). A target charging power is determined according to the charging voltage and/or the charging current of the battery, and a target charging current is determined according to the output current of the wireless power receiving circuit (102). An adjustment request is sent to a power supply device, where the adjustment request carries the target charging power and/or the target charging current (103). An adjusted wireless charging signal is received from a wireless charging apparatus.

20 Claims, 7 Drawing Sheets

(51) Int. Cl.
  *H02J 50/12* (2016.01)
  *H02J 50/80* (2016.01)

(52) U.S. Cl.
  CPC .... *H02J 7/00714* (2020.01); *H02J 7/007182* (2020.01); *H02J 50/12* (2016.02); *H02J 50/80* (2016.02); *H02J 2207/20* (2020.01)

(58) Field of Classification Search
  CPC ........ H02J 50/12; H02J 50/80; H02J 2207/20; H02J 7/00034
  See application file for complete search history.

(56) References Cited

U.S. PATENT DOCUMENTS

2019/0013702 A1* 1/2019 Muratov ................. H02J 50/80
2020/0091780 A1* 3/2020 Lee ......................... H02J 50/80

FOREIGN PATENT DOCUMENTS

| | | |
|---|---|---|
| CN | 105375596 | 3/2016 |
| CN | 108988511 | 12/2018 |
| EP | 3068017 | 9/2016 |
| JP | 2007151261 | 6/2007 |
| WO | 2018184285 | 10/2018 |
| WO | 2018184578 | 10/2018 |
| WO | WO-2018184578 A1 * 10/2018 ............. H01F 27/28 |

OTHER PUBLICATIONS

EPO, Extended European Search Report for EP Application No. 18943819.5, dated Oct. 12, 2021.
CNIPA, First Office Action for CN Application No. 201880098952.8, dated Jun. 3, 2023.
WIPO, International Search Report for PCT/CN2018/122654, dated Sep. 19, 2019.
CNIPA, Second Office Action for CN Application No. 201880098952.8, Dec. 27, 2023.

* cited by examiner

WIRELESS CHARGING METHODS AND DEVICE TO-BE-CHARGED

CROSS REFERENCE TO RELATED APPLICATION(S)

This application is a continuation of International Application No. PCT/CN2018/122654, filed on Dec. 21, 2018, the entire disclosure of which is incorporated herein by reference.

TECHNICAL FIELD

This disclosure relates to the technical field of wireless charging, and more particularly to wireless charging methods and a device to-be-charged.

BACKGROUND

Wireless charging originates from wireless electrical-energy transmission and can include low-power wireless charging and high-power wireless charging. The low-power wireless charging often adopts electromagnetic induction, such as Qi standard for charging mobile phones. The high-power wireless charging often adopts resonance to transfer energy from a wireless charging apparatus to a device to-be-charged.

However, during wireless charging, when a charging power is increased by increasing a charging current or a charging voltage, heat will be generated during charging. The related art fails to improve wireless charging efficiency while reducing heat generation during charging.

SUMMARY

Implementations provide a wireless charging method. The method is applicable to a device to-be-charged. The device to-be-charged includes a wireless power receiving circuit. The method includes the following. During wireless charging, an output current of the wireless power receiving circuit and a charging voltage of a battery and/or a charging current of the battery are detected. A target charging power is determined according to the charging voltage and/or the charging current of the battery, and a target charging current is determined according to the output current of the wireless power receiving circuit. An adjustment request is sent to a power supply device, where the adjustment request carries the target charging power and/or the target charging current. An adjusted wireless charging signal is received from a wireless charging apparatus, and wireless charging is performed according to the adjusted wireless charging signal.

Implementations provide a wireless charging method. The method is applicable to a power supply device including a voltage adjusting circuit. The method includes the following. During wireless charging, an adjustment request is received from a device to-be-charged, where the adjustment request carries a target charging power and/or a target charging current. In response to the adjustment request, an output voltage of the voltage adjusting circuit is adjusted according to the target charging power and/or the target charging current. According to the output voltage of the voltage adjusting circuit, a wireless charging apparatus is controlled to send an adjusted wireless charging signal to the device to-be-charged, such that an output of the wireless charging apparatus matches the target charging power and/or the target charging current. Implementations provide a device to-be-charged. The device to-be-charged includes: a battery, a detecting circuit, a first processor, a first wireless communication circuit, and a wireless power receiving circuit. The detecting circuit is configured to detect, during wireless charging, an output current of a wireless power receiving circuit and at least one of a charging voltage of the battery and a charging current of the battery. The first wireless communication circuit is configured to send an adjustment request to a power supply device, wherein the adjustment request carries at least one of the target charging power and the target charging current. The wireless power receiving circuit configured to receive from a wireless charging apparatus an adjusted wireless charging signal, and perform wireless charging according to the adjusted wireless charging signal.

DETAILED DESCRIPTION

Technical solutions of implementations will be described clearly and completely with reference to the accompanying drawings. It can be understood that, implementations described herein are merely for explaining, rather than limiting, the disclosure. In addition, for the convenience of description, the accompanying drawings only illustrate parts related to the disclosure.

In existing wireless charging technologies, a constant 5V (volt)/1A (ampere) or 9V/1.2A is outputted to a device to-be-charged. The device to-be-charged needs to be further provided with a charging management module for charging of a battery, which is low in efficiency and will cause serious heating.

Wireless charging originates from wireless electrical-energy transmission. According to various wireless charging principles, wireless charging can be in the manner of electromagnetic induction (or magnetic coupling), radio waves, and magnetic resonance. At present, main wireless charging standard includes Qi standard, power matters alliance (PMA) standard, and alliance for wireless power (A4WP) standard. Under the Qi standard and the PMA standard, electromagnetic induction is adopted for wireless charging, and under the A4WP standard, magnetic resonance is adopted for wireless charging. According to implementations, wireless charging of a device to-be-charged adopts electromagnetic induction. Energy is transferred from a wireless charging apparatus to the device to-be-charged through a magnetic field, and there is no need to provide a charging cable for connection therebetween. As such, wireless charging can be performed on a battery of the device to-be-charged, which makes charging more convenient.

A fixed-frequency working mode in wireless charging refers to that a working frequency of a wireless power transmitting circuit of a wireless charging apparatus remains unchanged in wireless charging. When a wireless charging system adjusts an input voltage of the wireless power transmitting circuit to control an output power of a wireless power receiving circuit, since a ratio of the number of turns of a transmitting coil to that of a receiving coil is usually 1:1, a ratio of an output voltage of the wireless power receiving circuit to the input voltage of the wireless power transmitting circuit is roughly 1:1. Therefore, during wireless charging, the output voltage of the wireless power receiving circuit can be adjusted directly by adjusting the input voltage of the wireless power transmitting circuit.

Figure 1:
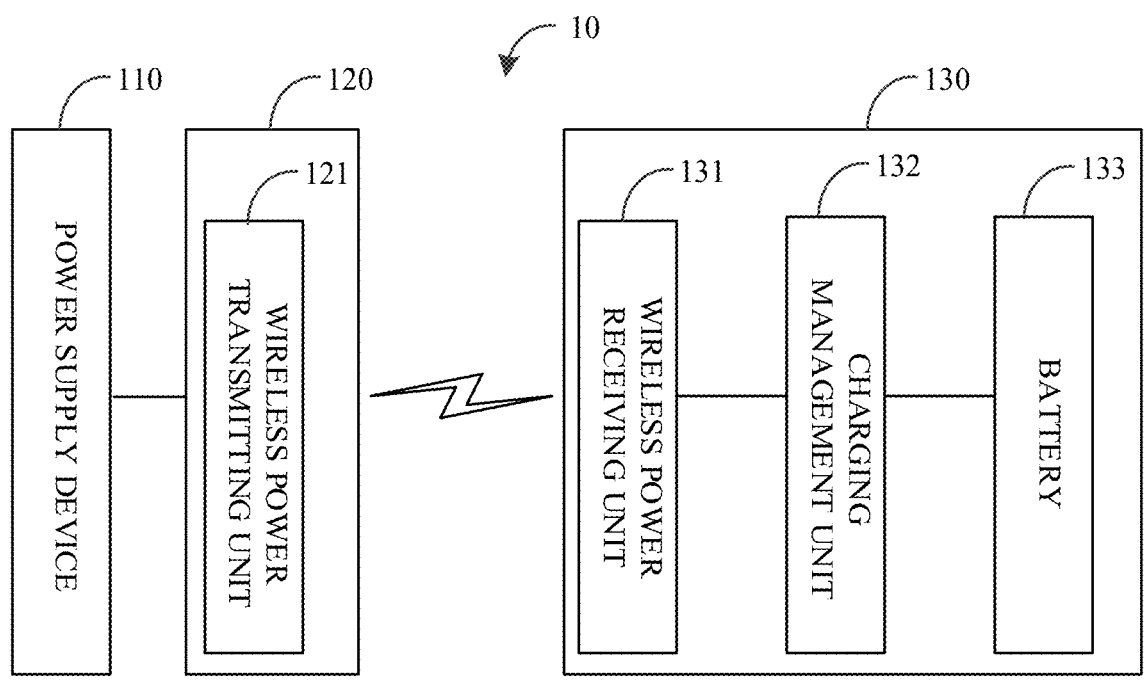
FIG. 1 is a schematic diagram of a wireless charging manner.

FIG. 1 is a schematic diagram of a wireless charging manner. In the related art, as illustrated in FIG. 1, a wireless charging system 10 includes a power supply device 110, a wireless charging apparatus 120, and a device to-be-charged 130. The wireless charging apparatus 120 can be, for example, a wireless charging base. The device to-be-charged 130 can be, for example, a terminal.

After the power supply device 110 is coupled with the wireless charging apparatus 120, an output voltage and an output current of the power supply device 110 can be transmitted to the wireless charging apparatus 120.

The wireless charging apparatus 120 can convert, via an internal wireless power transmitting circuit 121, the output voltage and the output current of the power supply device 110 into a wireless charging signal (that is, an electromagnetic signal) for transmission. For example, the wireless power transmitting circuit 121 can convert the output current of the power supply device 110 into an alternating current (AC), and convert the AC, via a transmitting coil or transmitting antenna, into a wireless charging signal.

The device to-be-charged 130 can receive, via a wireless power receiving circuit 131, the wireless charging signal transmitted by the wireless power transmitting circuit 121, and convert the wireless charging signal into an output voltage and an output current of the wireless power receiving circuit 131. For example, the wireless power receiving circuit 131 can convert, through a receiving coil or receiving antenna, the wireless charging signal transmitted by the wireless power transmitting circuit 121 into an AC, and rectify and/or filter the AC to convert the AC into the output voltage and the output current of the wireless power receiving circuit 131.

In some examples, before wireless charging, the wireless charging apparatus 120 will negotiate in advance with the device to-be-charged 130 a transmission power of the wireless power transmitting circuit 121. If the power negotiated between the wireless charging apparatus 120 and the device to-be-charged 130 is 5 W (watt), the output voltage and the output current of the wireless power receiving circuit 131 is generally 5V and 1A respectively. If the power negotiated between the wireless charging apparatus 120 and the device to-be-charged 130 is 10.8 W, the output voltage and the output current of the wireless power receiving circuit 131 is generally 9V and 1.2A respectively.

If the output voltage of the wireless power receiving circuit 131 is not suitable for being directly applied to a battery 133, the output voltage of the wireless power receiving circuit 131 needs to be subjected to constant-voltage control and/or constant-current control performed by a charging management unit 132 of the device to-be-charged 130, to obtain a charging voltage and/or a charging current expected by the battery 133 of the device to-be-charged 130.

The charging management unit 132 is configured to convert the output voltage of the wireless power receiving circuit 131, such that an output voltage and/or an output current of the charging management unit 132 meets requirements on charging voltage and/or charging current of the battery 133. As an example, the charging management unit 132 may be, for example, a charging integrated circuit (IC), a boost circuit, or a low dropout (LDO) linear voltage regulator.

Due to limitations of the charging management unit 132 in terms of low power-conversion efficiency (also referred to as energy-conversion efficiency or circuit conversion efficiency), unconverted electrical energy may dissipate as heat, and such heat will accumulate inside the device to-be-charged 130. In addition, design space and heat dissipation space of the device to-be-charged 130 are both very small (for example, mobile terminals are becoming lighter and thinner in physical size, and meanwhile, a large number of electronic components are densely arranged inside the mobile terminal to improve performance of the mobile terminal), which not only makes design of the charging management unit 132 more difficult, but also makes it difficult to promptly remove heat accumulated inside the device to-be-charged 130, which can cause the device to-be-charged 130 to malfunction.

In order to reduce heating of the charging management unit 132, the wireless charging apparatus 120 can output a charging power in the manner of low voltage and large current, for example, a charging power of 5V/4A. As an example, the wireless power transmitting circuit 121 can generate the wireless charging signal based on 5V/4A. Accordingly, the wireless power receiving circuit 131 can convert the wireless charging signal into an output voltage/ output current of 5V/4A. However, a large charging current of 4 A will cause a large amount of heat which is generated by a transmitting coil of the wireless power transmitting circuit 121 and a receiving coil of the wireless power receiving circuit 131 during electrical energy transmission, and heating during charging will adversely affect charging speed and service life of a product and decrease reliability of a product.

Therefore, how to reduce heating during wireless charging has become a problem to be solved.

In some examples, in order to reduce heating of a coil during wireless charging, a low charging power is adopted. For example, the wireless charging apparatus 120 outputs only a charging power of at most 7.5 W to charge the device to-be-charged 130. In such a charging manner, charging speed will be low, and it will take a long time to fully charge the device to-be-charged 130.

In other examples, instead of adopting a low charging power, in order to increase charging speed, the wireless charging apparatus 120 increases the charging power (for example, the charging power is increased from 7.5 W to 10 W) for wireless charging. As described above, when a high charging power is adopted for wireless charging, it will result in heating of a coil or heating of the charging management unit 132. In a system in which magnetic coupling is adopted for wireless charging, a distance between the wireless charging apparatus 120 and the device to-be-charged 130 is usually very short. As a result, heat generated by a coil of the wireless charging apparatus 120 will be transferred to the device to-be-charged 130. For the device to-be-charged 130, heat generated by a coil and the charging management unit of the device to-be-charged 130 will be transferred to the battery to some extent. In addition, due to heating of the battery itself during charging, a temperature of the battery will easily exceed a safe charging range. When heating of the coil, heating of the charging management unit, and heating of the battery exceed the safe charging range, it is necessary to return to a low charging power (such as 7.5 W) or stop charging, to ensure safe charging. Therefore, in the above charging manner, although a maximum charging power in wireless charging is increased, the maximum charging power is adopted for charging only for a short time, and since a high charging power is adopted for wireless charging only for a short time, it is impossible to shorten a charging duration to an expected charging duration (for example, shorter than 100 minutes).

In addition, in order to reduce heating, heat dissipation technologies, such as graphene, a heat dissipation plate, or the like, can be adopted for heat dissipation during charging. However, these heat dissipation technologies are low in efficiency, and on the other hand, will increase product cost, occupy an internal space of a product, and affect product appearance.

In order to solve the above problems, implementations provide a wireless charging system. The wireless charging system includes a wireless-charging-signal transmitting apparatus (such as the wireless charging apparatus described above) and a wireless-charging-signal receiving apparatus (such as the device to-be-charged described above). The wireless-charging-signal transmitting apparatus can perform wireless communication with the wireless-charging-signal receiving apparatus, and a transmission power of the wireless-charging-signal transmitting apparatus can be adjusted according to feedback information sent by the wireless-charging-signal receiving apparatus, such that the transmission power of the wireless-charging-signal transmitting apparatus matches a charging voltage and/or a charging current currently required by the battery. Therefore, wireless charging power can be increased according to charging requirements of the wireless-charging-signal receiving apparatus, thereby increasing charging speed.

On the other hand, in order to avoid that the output current of the wireless power receiving circuit is too large, the wireless-charging-signal receiving apparatus can feed back information on the output current of the wireless receiving circuit. As such, the wireless-charging-signal transmitting apparatus can adjust the transmission power thereof according to feedback information of the output current of the wireless receiving circuit, such that the output current of the wireless receiving circuit satisfies a preset condition.

By controlling the output current of the wireless receiving circuit through the wireless-charging-signal transmitting apparatus, it is possible to control heating of the wireless power transmitting circuit (including the transmitting coil) and the wireless receiving circuit (including the receiving coil), thereby reducing heating during charging. Therefore, compared with the above charging manners, it is possible to prolong a duration of high-power wireless charging, thereby increasing charging speed and shortening charging time.

Implementations provide a wireless charging method. The method is applicable to a wireless charging system. The wireless charging system includes a wireless charging apparatus, a device to-be-charged, and a power supply device. The power supply device may be an adaptor, a power bank, a computer, or the like. An output current of the power supply device may be a constant direct current (DC), a pulsating DC, or an AC. The wireless charging apparatus may include a voltage converter, a wireless power transmitting circuit, and a processor. The device to-be-charged may include a wireless power receiving circuit, a charging management module, a battery, and a processor. In the wireless charging system, the wireless charging apparatus can perform wireless communication with the device to-be-charged for data transmission.

Implementations provide a wireless charging method. According to an output current of the wireless power receiving circuit and a charging voltage of the battery and/or a charging current of the battery, the device to-be-charged can control an output voltage of the wireless power receiving circuit through real-time adjustment of transmission power, voltage, and current in wireless charging, thereby controlling heating during wireless charging while improving charging efficiency.

Figure 2:
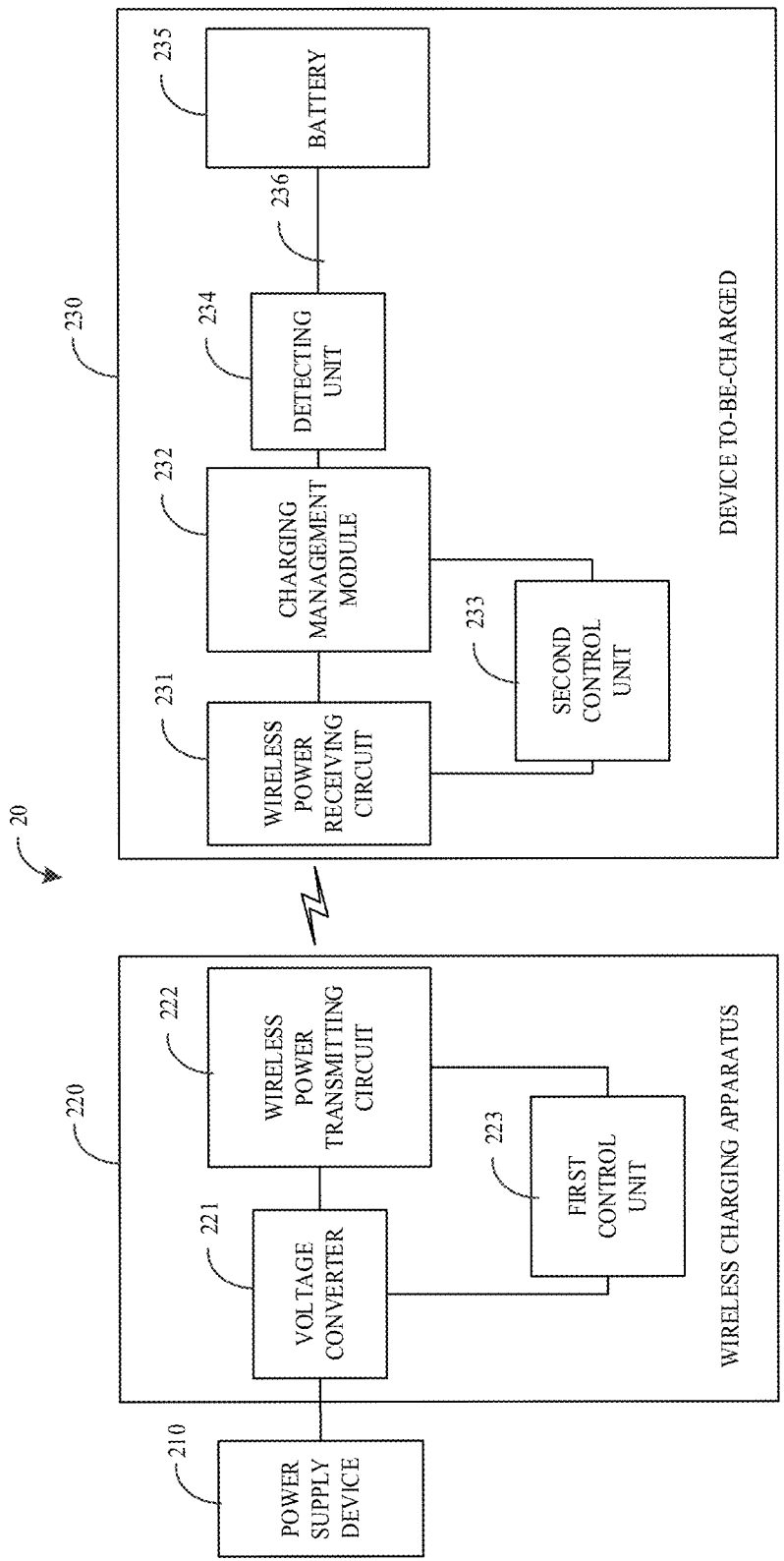
FIG. 2 is a schematic diagram illustrating an implementation of wireless charging according to implementations.

FIG. 2 is a schematic diagram illustrating an implementation of wireless charging according to implementations. As illustrated in FIG. 2, a wireless charging system 20 of implementations includes a power supply device 210, a wireless charging apparatus 220, and a device to-be-charged 230.

According to implementations, the power supply device 210 is configured to provide electrical energy to the wireless charging apparatus 220. The power supply device 210 may include a rectifying circuit, a transformer, a control circuit, a charging interface, etc. The power supply device 210 can convert an input AC into a DC to be outputted to the wireless charging apparatus 220. For example, the power supply device may be an adaptor, a power bank, or a vehicle-mounted power supply.

According to implementations, the power supply device 210 can also provide directly an AC to the wireless charging apparatus 220. For example, the power supply device 210 may be an AC power supply. When the power supply device 210 is an AC power supply, the wireless charging apparatus 220 further includes a circuit or module for converting an AC into a DC, for example, a rectifying-and-filtering circuit, a DC/DC converting unit, etc.

The wireless charging apparatus 220 is configured to convert a DC or an AC provided by the power supply device 210 into an electromagnetic signal for electrical power transmission in a wireless manner.

As illustrated in FIG. 2, according to implementations, the wireless charging apparatus 220 includes a voltage converter 221, a wireless power transmitting circuit 222, and a first control unit 223. It can be understood by those skilled in the art that the structure of the wireless charging apparatus 220 illustrated in FIG. 2 does not constitute any limitation on a wireless charging apparatus. The wireless charging apparatus may include more or fewer components than illustrated, or may combine some components or adopt a different arrangement of components.

The power supply device 210 may be a common adaptor, or may be a voltage-adjustable adaptor (that is, the adaptor itself can adjust an output voltage thereof), or may be a power bank. If the power supply device 210 is a voltage-adjustable adaptor, the voltage converter 221 of the wireless charging apparatus 220 can be omitted. Here, the voltage converter 221 is configured for DC/DC conversion, to adjust an output voltage of the power supply device 210 to a fixed voltage to be provided to the wireless power transmitting circuit 222.

The wireless power transmitting circuit 222 is configured to convert a DC provided by the voltage converter 221 or a DC provided by power supply device 210 into an AC that can be coupled to a transmitting coil, and convert, through the transmitting coil, the AC into an electromagnetic signal for transmission.

According to implementations, the wireless power transmitting circuit 222 may include an inverter unit and a resonant unit. The inverter unit may include multiple switch transistors. The transmission power can be adjusted by controlling a turn-on time (that is, duty cycle) of a switch transistor. The resonant unit is configured to transmit electrical energy. For example, the resonant unit may include a capacitor and a transmitting coil. By adjusting a working frequency of the resonant unit, the transmission power of the wireless power transmitting circuit 222 can be adjusted.

According to implementations, the wireless charging apparatus 220 may be a wireless charging base or a device with an energy storage function. When the wireless charging apparatus 220 is a device with an energy storage function, the wireless charging apparatus further includes an energy storage module (such as a lithium battery), which can acquire electrical energy from an external power supply device 210 for storage. As such, the energy storage module can provide electrical energy to the wireless power transmitting circuit 222. It can be understood by those skilled in the art that the wireless charging apparatus 220 can acquire electrical energy from the external power supply device 210 in a wired manner or a wireless manner. In terms of the wired manner, for example, the wireless charging apparatus 220 is coupled with the power supply device 210 via a charging interface (such as a Type-C interface or universal serial bus (USB) interface) to acquire electrical energy. In terms of the wireless manner, for example, the wireless charging apparatus 220 further includes a wireless power receiving circuit, which can acquire electrical energy wirelessly from a device with a wireless charging function.

The first control unit 223 is configured to control wireless charging. For instance, the first control unit 223 may communicate with the power supply device 210 to determine an output voltage and/or an output current of the power supply device, or may communicate with a device to-be-charged 230 to exchange charging information (such as a voltage of a battery 235 of the device to-be-charged 230, a temperature of the battery 235, a charging mode, or the like) and to determine charging parameters (such as a charging voltage and/or a charging current) for wireless charging.

It can be understood by those skilled in the art that the wireless charging apparatus 220 can further include other related hardware, logic components, units, and/or codes for performing respective functions. For example, the wireless charging apparatus 220 can further include a display module (such as a light emitting diode (LED) or an LED display screen), which is configured to display in real time a charging status (for example, in charging, or charging completed) during wireless charging, and the disclosure is not limited in this regard.

As illustrated in FIG. 2, the device to-be-charged 230 includes the wireless power receiving circuit 231, a charging management module 232, a second control unit 233, a detecting unit 234, the battery 235, and a first charging channel 236. It can be understood by those skilled in the art that the structure of the device to-be-charged 230 illustrated in FIG. 2 does not constitute any limitation on a device to-be-charged. The device to-be-charged may include more or fewer components than illustrated, or may combine some components or adopt a different arrangement of components.

The power supply device 210 is configured to power the wireless charging apparatus 220. The device to-be-charged 230 is placed on a surface of the wireless charging apparatus 220. The wireless charging apparatus 220 charges the battery 235 of the device to-be-charged 230 through electromagnetic induction. Here, a wireless connection is established between the wireless charging apparatus 220 and the device to-be-charged 230. In addition, the wireless charging apparatus 220 and the device to-be-charged 230 can also communicate with each other.

A wireless communication manner may include, but is not limited to, Bluetooth®, wireless fidelity (Wi-Fi), high-carrier-frequency based short-distance wireless communication, optical communication, ultrasonic communication, ultra-wideband communication, mobile communication, and the like, and the disclosure is not limited in this regard.

The wireless power receiving circuit 231 is configured to covert, through a receiving coil, an electromagnetic signal transmitted by the wireless power transmitting circuit 222 of the wireless charging apparatus 220 into an AC, and rectify and/or filter the AC to convert the AC into a stable DC to be applied to the battery 235 for charging.

According to implementations, the wireless power receiving circuit 231 includes the receiving coil and an AC/DC converting unit. The AC/DC converting unit is configured to convert an AC, which is received by the receiving coil, into a DC.

According to implementations, the battery 235 may include one single cell or multiple cells. When the battery 235 includes multiple cells, the multiple cells are coupled in series. As such, a charging voltage that can be borne by the battery 235 is a sum of charging voltages that can be borne by the multiple cells, which is possible to increase charging speed and reduce heating during charging.

The first charging channel 236 may be a wire. The first charging channel 236 may be provided with the charging management module 232.

The charging management module 232 is configured to perform boost conversion or buck conversion on a DC outputted by the wireless power receiving circuit 231, to obtain an output voltage and an output current of the first charging channel 236. According to implementations herein, a voltage value and a current value of a DC outputted from the first charging channel 236 meet requirements on charging of the battery 235 and thus can be directly applied to the battery 235 for charging.

The charging management module 232 may include a second voltage converting unit. The second voltage converting unit may be a boost converting circuit, a buck converting circuit, a buck-boost converting circuit, or an LDO voltage regulator, or may be a charge pump, or may be a direct-charging circuit, which is not limited herein.

The detecting unit 234 is configured to detect a voltage value and/or a current value at the first charging channel 236. The voltage value and/or the current value at the first charging channel 236 may refer to a voltage value and/or a current value between the wireless power receiving circuit 231 and the charging management module 232, that is, an output voltage and/or an output current of the wireless power receiving circuit 231. Alternatively, the voltage value and/or the current value at the first charging channel may also refer to a voltage value and/or a current value between the charging management module 232 and the battery 235, that is, an output voltage and/or an output current of the charging management module 232.

The detecting unit 234 may include a voltage detecting unit 234 and a current detecting unit 234. The voltage detecting unit 234 may be configured to sample a voltage at the first charging channel 236, and send the sampled voltage value to the second control unit 233. The voltage detecting unit 234 can sample the voltage at the first charging channel 236 through serial-connection. The current detecting unit 234 can be configured to sample a current at the first charging channel 236, and send the sampled current value to the second control unit 233. The current detecting unit 234 can sample the current at the first charging channel 236 via a current detecting resistor or a current detector.

The second control unit 233 is configured to communicate with the first control unit 223 of the wireless charging apparatus 220, to feed back to the first control unit 223 the voltage value and/or the current value detected by the detecting unit 234. In this way, the first control unit 223 can adjust the transmission power of the wireless power transmitting unit 222 according to the voltage value and/or the current value that is fed back, such that a voltage value and/or a current value of the DC outputted from the first charging channel 236 matches a charging voltage value and/or a charging current value required by the battery 235.

"Match the charging voltage value and/or the charging current value required by the battery 235" may mean that the voltage value and/or the current value of the DC outputted from the first charging channel 236 is equal to the charging voltage value and/or the charging current value required by the battery 235, or the difference therebetween is within a preset range (for example, the voltage value is 100 mV (millivolt)~200 mV higher or lower than the charging voltage value).

The second control unit 233 may be an independent microcontroller unit (MCU) of the device to-be-charged 230, which is conducive to reliable control. The second control unit 233 may also be an application processor (AP) of the device to-be-charged 230, which is possible to save hardware cost. The disclosure is not limited in this regard.

Technical solutions of implementations will be hereinafter described clearly and comprehensively with reference to the accompanying drawings of implementations.

Figure 3:
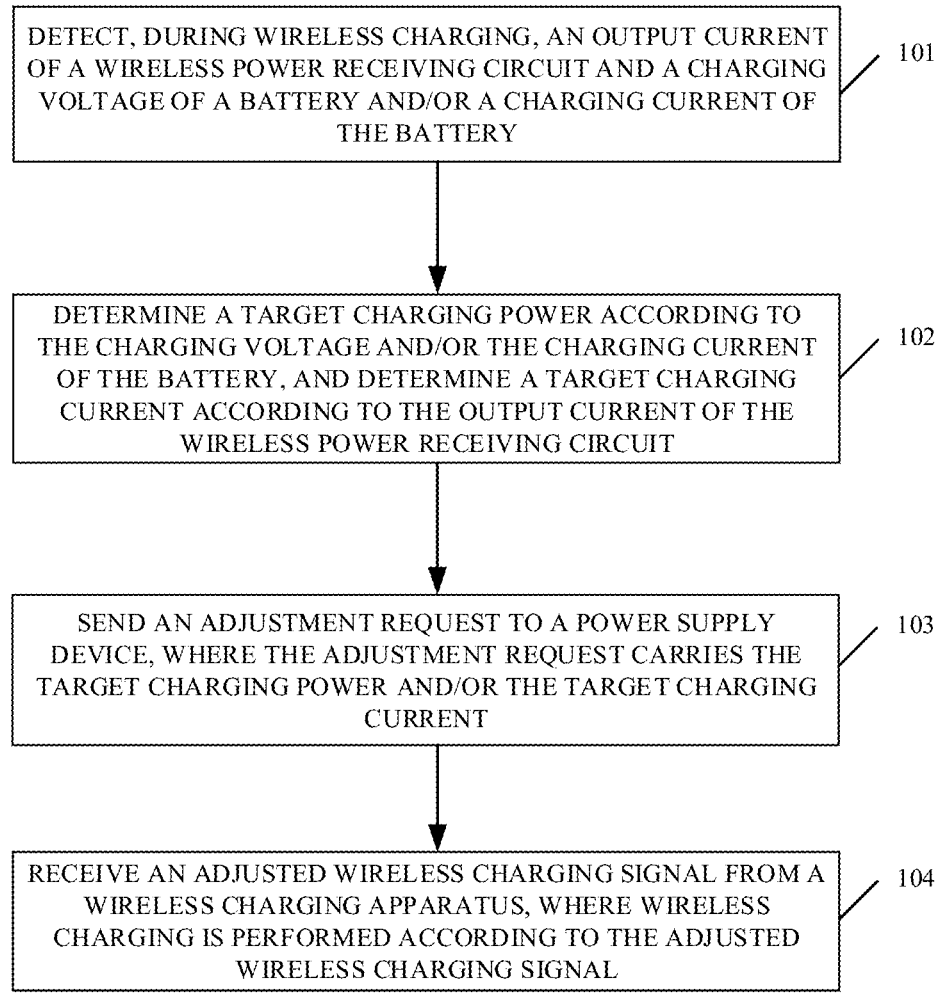
FIG. 3 is a schematic flowchart of a wireless charging method according to implementations.

Implementations provide a wireless charging method. The method is applicable to a device to-be-charged. The device to-be-charged includes a wireless power receiving circuit. FIG. 3 is a schematic flowchart of a wireless charging method according to implementations. As illustrated in FIG. 3, the method implemented by the device to-be-charged includes the following.

At block 101, during wireless charging, an output current of the wireless power receiving circuit and a charging voltage of a battery and/or a charging current of the battery are detected.

According to implementations, during wireless charging, the device to-be-charged detects the output current of the wireless power receiving circuit and the charging voltage and/or the charging current of the battery.

In addition, during wireless charging, the device to-be-charged can detect a charging status. The charging status during wireless charging of the device to-be-charged may include trickle charging, constant-current charging, and constant-voltage charging.

The device to-be-charged further includes the battery. In this way, during wireless charging, the device to-be-charged can detect the battery to obtain the charging voltage and/or the charging current of the battery.

The device to-be-charged may be part of a wireless charging system. The wireless charging system may further include a wireless charging apparatus and a power supply device. The wireless charging apparatus performs wireless charging on the device to-be-charged by establishing a wireless connection with the device to-be-charged. For example, the wireless charging apparatus may be a wireless charging base. The power supply device may be configured to power the wireless charging apparatus. The power supply device may be an adaptor, a power supply, or the like.

Based on FIG. 2 described above, the wireless charging system may include the power supply device, the wireless charging apparatus, and the device to-be-charged. The wireless charging apparatus includes a voltage converter, a wireless power transmitting circuit, and a first control unit. The device to-be-charged includes the wireless power receiving circuit, a charging management module, a second control unit, and the battery. The voltage converter is configured for DC/DC conversion, to adjust a first output voltage of the power supply device to a fixed voltage to be provided to the wireless power transmitting circuit. The charging management module may include a boost converting unit, a buck converting unit, a buck-boost converting unit, a charge pump, or a direct-charging unit. The wireless power transmitting circuit includes a transmitting coil. The wireless power receiving circuit includes a receiving coil. Through electromagnetic induction between the transmitting coil and the receiving coil, the fixed voltage received by the wireless power transmitting circuit can be transmitted to the wireless power receiving circuit. The first control unit and the second control unit each may be an MCU. The second control unit may be implemented by an AP of a terminal. The disclosure is not limited in this regard.

The power supply device is configured to power the wireless charging apparatus. By adopting wireless communication technology, the wireless charging apparatus charges the battery of the device to-be-charged through electromagnetic induction. The power supply device is coupled with the voltage converter of the wireless charging apparatus, and the voltage converter converts the first output voltage of the power supply device (such voltage conversion is controlled by the first control unit) to obtain a second output voltage; the second output voltage is transmitted to the wireless power transmitting circuit and then transmitted, through electromagnetic induction, to the wireless power receiving circuit by the wireless power transmitting circuit, and thus the wireless power receiving circuit outputs a third output voltage. The third output voltage then undergoes voltage stabilization, boost conversion, or buck conversion performed by the charging management module (such a process is controlled by the second control unit), and then a charging voltage and a charging current thus obtained are applied to the battery for charging.

According to implementations, the device to-be-charged is a terminal capable of conducting wireless communication with the wireless charging apparatus. The device to-be-charged may be any terminal with communication and storage functions, for example, a tablet computer, a mobile phone, an E-reader, a remote control, a personal computer (PC), a notebook computer, an in-vehicle device, a network television, a wearable device, a personal digital assistant (PDA), a portable media player (PMP), a navigating device, etc.

According to implementations, before wireless charging, the device to-be-charged can establish a wireless connection and perform two-way communication with the wireless charging apparatus for wireless charging.

A wireless communication can be established between the power supply device and the device to-be-charged, thereby achieving two-way data transmission.

The power supply device of the wireless charging system may be a voltage-adjustable power supply device. The power supply device may be provided with a voltage adjusting circuit, and as such, an output voltage of the power supply device can be adjusted in real time via the voltage adjusting circuit.

According to implementations, the power supply device can be configured to power the wireless charging apparatus. The power supply device may be coupled with the wireless charging apparatus via a USB interface. The USB interface may be a common USB interface, or may be a micro USB interface or Type C interface. A power line of the USB interface is used for powering the wireless charging apparatus by the power supply device, and may be a VBus line and/or a ground line of the USB interface. A data line of the USB interface is used for two-way communication between the power supply device and the wireless charging apparatus. The data line may be a D+ line and/or a D− line of the USB interface. "Two-way communication" may refer to information exchange between the power supply device and wireless charging apparatus.

The power supply device is operable in a normal charging mode and a quick charging mode. A charging current in the quick charging mode is larger than that in the normal charging mode, that is, a charging speed in the quick charging mode is higher than that in the normal charging mode.

According to implementations, when the wireless charging system adjusts an input voltage of the wireless power transmitting circuit to control an output power of the wireless power receiving circuit, since a ratio of the number of turns of the transmitting coil to that of the receiving coil is usually 1:1, a ratio of an output voltage of the wireless power receiving circuit to the input voltage of the wireless power transmitting circuit is roughly 1:1. Therefore, during wireless charging, the output voltage of the wireless power receiving circuit can be adjusted directly by adjusting the input voltage of the wireless power transmitting circuit. In other words, in a fixed-frequency working mode in wireless charging, that is, a working frequency of the wireless power transmitting circuit of the wireless charging apparatus remains unchanged in wireless charging, the output voltage of the wireless power receiving circuit can be adjusted directly by adjusting the input voltage of the wireless power transmitting circuit.

At block 102, a target charging power is determined according to the charging voltage and/or the charging current of the battery, and a target charging current is determined according to the output current of the wireless power receiving circuit.

According to implementations, after detecting the output current of the wireless power receiving circuit and the charging voltage and/or the charging current of the battery, the device to-be-charged determines the target charging power according to the charging voltage and/or the charging current of the battery, and determines the target charging current according to the output current of the wireless power receiving circuit.

The device to-be-charged can first obtain, according to the charging status, a preset threshold parameter corresponding to the charging status, and compare the charging voltage and/or the charging current of the battery with the preset threshold parameter, to determine whether power adjustment is required. Upon determining that power adjustment is required, the device to-be-charged can determine the target charging power according to the charging voltage and/or the charging current of the battery. In one example, if the charging status is constant-current charging, the device to-be-charged can determine a preset threshold current corresponding to the charging status, and then determine the target charging power according to the preset threshold current and the charging voltage of the battery.

The device to-be-charged may also obtain, according to the charging status, a preset output-current range corresponding to the charging status, and compare the output current of the wireless power receiving circuit and the preset output-current range, to determine whether power adjustment is required. Upon determining that power adjustment is required, the device to-be-charged can determine the target charging current according to the output current of the wireless power receiving circuit.

According to implementations, in addition to taking into consideration whether a charging parameter of the battery satisfies a preset charging power, the device to-be-charged needs to further take into consideration whether the output current of the wireless power receiving circuit satisfies a preset current range. In other words, in the wireless charging method provided herein, when determining whether power adjustment is required, the following two aspects should be considered: (i) whether charging efficiency can be ensured, and (ii) whether a voltage difference of the charging management module is controlled to be small values.

Alternatively, after detecting the output current of the wireless power receiving circuit and the charging voltage and/or the charging current of the battery, the device to-be-charged can send directly to the wireless charging apparatus the charging status, the output current of the wireless power receiving circuit, and the charging voltage and/or the charging current of the battery, such that the wireless charging apparatus can determine whether power adjustment is required.

In other words, in the wireless charging system provided herein, whether power adjustment is required may be determined by the device to-be-charged, or may be determined by the wireless charging apparatus.

In some implementations, after determining the target charging power according to the charging voltage and/or the charging current of the battery, the device to-be-charged can directly determine a present charging power according to the charging voltage and/or the charging current of the battery. A product of the charging voltage of the battery and the charging current of the battery is the present charging power.

After determining the target charging power and the present charging power, the device to-be-charged can determine a power difference according to the target charging power and the present charging power. The power difference may be indicative of an amount for power adjustment (that is, the power is adjusted by such an amount). The device to-be-charged can make subtraction on the target charging power and the present charging power, to obtain the power difference.

At block 103, an adjustment request is sent to the power supply device, where the adjustment request carries the target charging power and/or the target charging current.

According to implementations, after determining the target charging power according to the charging voltage and/or the charging current of the battery and determining the target charging current according to the output current of the wireless power receiving circuit, the device to-be-charged sends the adjustment request to the power supply device.

The adjustment request carries the target charging power and/or the target charging current.

After determining that charging power needs to be adjusted, the device to-be-charged needs to adjust an input current and an input voltage of the wireless power receiving circuit. Therefore, it is necessary for the device to-be-charged to send the adjustment request to the power supply device, such that the power supply device can adjust an output voltage of the voltage adjusting circuit, to adjust an output voltage and an output current of the wireless power transmitting circuit of the wireless charging apparatus, thereby adjusting the input current and the input voltage of the wireless power receiving circuit.

According to implementations, wireless communication between the device to-be-charged and the power supply device can be performed in one or more of the following manners: Bluetooth®, Wi-Fi, high-carrier-frequency based short-distance wireless communication, optical communication, ultrasonic communication, ultra-wideband communication, and mobile communication.

If the output current of the wireless power receiving circuit does not exceed the preset output-current range, the device to-be-charged can feed back only the target charging power without feeding back the target charging current. In this scenario, it is necessary for the power supply device to store a threshold current value, a threshold voltage value, and the preset output-current range corresponding to the charging status. As such, the current and the voltage will not exceed their respective threshold values during power adjustment.

In some implementations, when the device to-be-charged sends the adjustment request to the power supply device, the adjustment request may further carry the present charging power and the power difference.

At block 104, an adjusted wireless charging signal is received from the wireless charging apparatus, and wireless charging is performed according to the adjusted wireless charging signal.

According to implementations, after sending the adjustment request to the power supply device, the device to-be-charged receives from the wireless charging apparatus the adjusted wireless charging signal in response to the adjustment request, and wireless charging is performed according to the adjusted wireless charging signal.

At the power supply device side, after receiving the adjustment request, the power supply device controls the output voltage of the voltage adjusting circuit, such that the wireless charging apparatus sends the adjusted wireless charging signal to the device to-be-charged. The device to-be-charged can receive the adjusted wireless charging signal via the wireless power receiving circuit, and wireless charging is performed according to the adjusted wireless charging signal.

In some implementations, after receiving the adjusted wireless charging signal, the wireless power receiving circuit of the device to-be-charged can output a target output voltage and a target output current. Then the charging management module converts the target output voltage and target output current and applies the converted target output voltage and the converted target output current to the battery for charging.

According to implementations, a voltage difference between the target output voltage and a converted output voltage obtained through the charging management module can be small, which is possible to avoid low conversion efficiency and rise in temperature due to a large voltage difference.

In some implementations, before the wireless charging apparatus performs wireless charging on the device to-be-charged, the device to-be-charged can determine a charging mode through wireless communication with the wireless charging apparatus. The charging mode may include a first wireless charging mode and a second wireless charging mode, where a charging speed in the first wireless charging mode is higher than that in the second wireless charging mode.

According to implementations, when the wireless charging apparatus performs wireless charging on the device to-be-charged, the wireless power transmitting circuit is operable in the first wireless charging mode and the second wireless charging mode. A charging speed at which the wireless power transmitting circuit charges the device to-be-charged in the first wireless charging mode is higher than that in the second wireless charging mode. In other words, compared with the wireless power transmitting circuit working in the second wireless charging mode, the wireless power transmitting circuit working in the first wireless charging mode takes less time to fully charge a battery of the same capacity of the device to-be-charged.

The second wireless charging mode can be referred to as a normal wireless charging mode and can be, for example, a conventional wireless charging mode based on the QI standard, the PMA standard, or the A4WP standard. The first wireless charging mode can be referred to as a quick wireless charging mode. The normal wireless charging mode can refer to a wireless charging mode in which the wireless power transmitting circuit has a low transmission power (usually lower than 15 W, and the commonly used transmission power is 5 W or 10 W). In the normal wireless charging mode, it usually takes several hours to fully charge a battery of high capacity (such as 3000 mA (milliampere)). However, in the quick wireless charging mode, the transmission power of the wireless power transmitting circuit is relatively high (usually higher than or equal to 15 W). Compared with the normal wireless charging mode, in the quick wireless charging mode, it takes substantially less charging time for the wireless power transmitting circuit to fully charge a battery of the same capacity, and the charging is faster.

Figure 4:
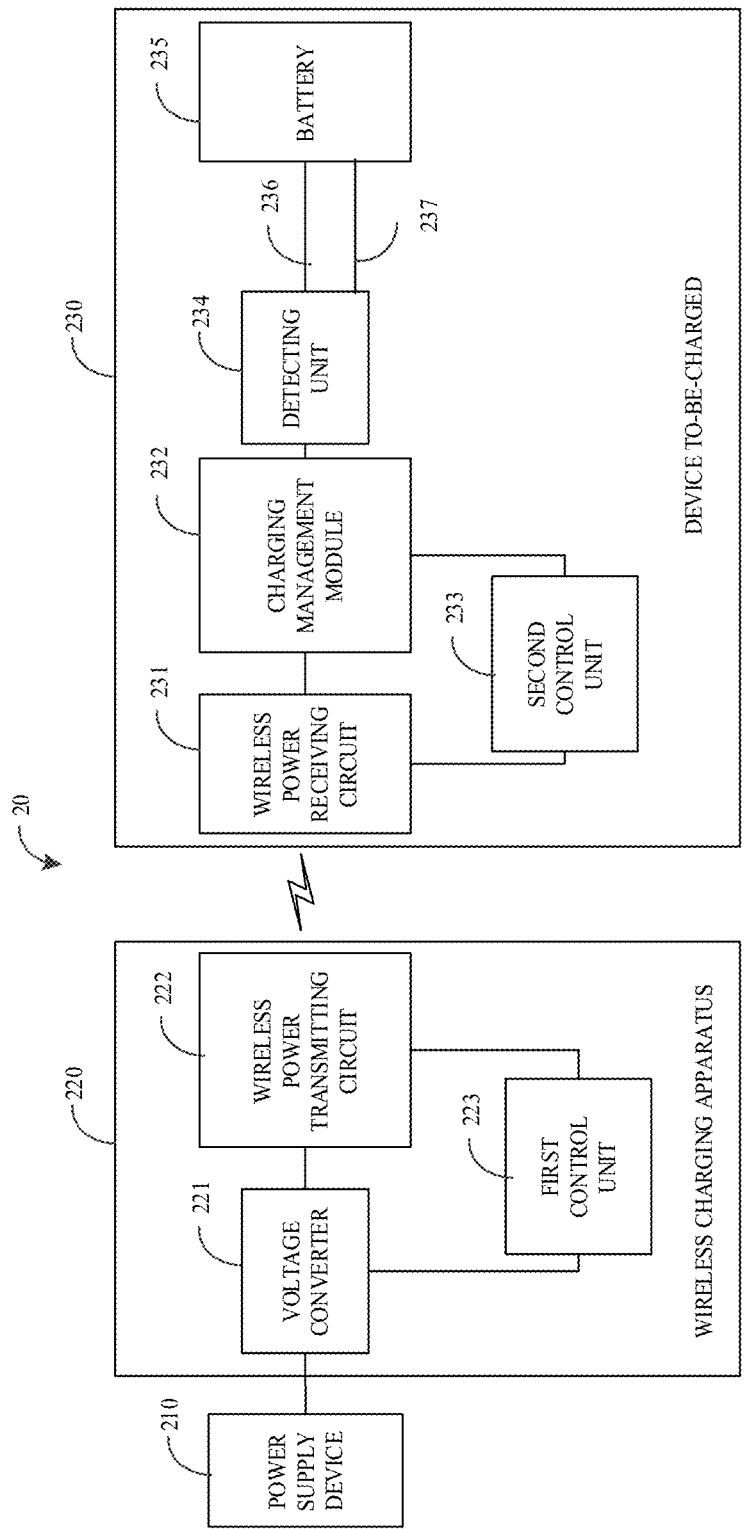
FIG. 4 is a schematic diagram illustrating an implementation of wireless charging according to other implementations.

Based on FIG. 2 above, FIG. 4 is a schematic diagram illustrating an implementation of wireless charging according to other implementations. As illustrated in FIG. 4, the device to-be-charged further includes a second charging channel 237. The second charging channel 237 may be a wire. The second charging channel 237 can be provided with a converting circuit. The converting circuit is configured to perform voltage control on a DC outputted by the wireless power receiving circuit, to obtain an output voltage and an output current of the second charging channel 237 to be applied to the battery for charging.

The converting circuit may include a voltage stabilizing circuit. The voltage stabilizing circuit is coupled with the wireless power receiving circuit.

When the battery is charged through the second charging channel, the wireless power transmitting circuit can transmit an electromagnetic signal at a constant transmission power. After the wireless power receiving circuit receives the electromagnetic signal, the converting circuit converts the electromagnetic signal into a voltage and a current which meet charging requirements of the battery, and such voltage and current subjected to conversion are applied to the battery for charging. It should be understood that, the "constant transmission power" does not mean that the transmission power remains completely constant, and instead, the transmission power can vary within a certain range, for example, the transmission power is 0~0.5 W higher or lower than 7.5 W.

The second control unit may be further configured to determine an error value by comparing a detected output voltage value of the second charging channel with a preset target value (which may be, for example, a voltage value required by the battery), and transmit the error value to a first control unit as data package. The output voltage value of the second charging channel may be a voltage value and/or a current value between the converting circuit and the battery.

When the battery is charged through the second charging channel, the wireless charging apparatus can wirelessly charge the device to-be-charged under the Qi standard. In this way, a data signal carrying the above error value can be coupled, through signal modulation, to a coil of the wireless power receiving circuit and then transmitted to a coil of the wireless power transmitting circuit and then to the first control unit.

When the battery is charged through the second charging channel, control of wireless electrical-energy transmission may be performed as follows. The second control unit determines the error value by comparing the detected output voltage value of the second charging channel with the preset target value, and transmit the error value to the first controller as data package. The first controller determines a difference according to a present current value of the transmitting coil and information carried in the data package, and determines a new working frequency according to the difference, to adjust the transmission power of the wireless power transmitting circuit.

According to implementations, a charging mode in which the battery is charged through the first charging channel is referred to as a first wireless charging mode. A charging mode in which the battery is charged through the second charging channel is referred to as a second wireless charging mode. The wireless charging apparatus can perform handshake communication with the device to-be-charged to determine to use the first wireless charging mode or the second wireless charging mode to charge the battery. In other words, when the charging voltage and the charging current are applied to the device to-be-charged for wireless charging, the charging voltage and the charging current can be applied for charging through the first charging channel corresponding to the first wireless charging mode, or the charging voltage and the charging current can also be applied for charging through the second charging channel corresponding to the second wireless charging mode.

In the wireless charging apparatus, when the device to-be-charged is charged in the first wireless charging mode, a maximum transmission power of the wireless power transmitting circuit may be a first transmission power value. When the device to-be-charged is charged in the second wireless charging mode, the maximum transmission power of the wireless power transmitting circuit may be a second transmission power value, where the first transmission power value is greater than the second transmission power value. Therefore, a charging speed at which the device to-be-charged is charged in the first wireless charging mode is higher than that in the second wireless charging mode.

In the device to-be-charged, the second control unit is configured to control switching between the first charging channel and the second charging channel according to the charging mode. When the first wireless charging mode is used, the second control unit controls a buck circuit on the first charging channel to work. When the second wireless charging mode is used, the second control unit controls the converting circuit on the second charging channel to work.

In some implementations, the device to-be-charged further includes the battery. The battery is a single-cell battery or a multi-cell battery. The multi-cell battery includes multiple cells coupled in series.

The battery of the device to-be-charged of implementations may include one cell, or may include N cells coupled in series (N is a positive integer greater than one). As an example, N=2. The battery may include a first cell and a second cell, and the first cell and the second cell are coupled in series. In an example, a charging power is 20 W, and a charging voltage applied to a single cell is 5V. In order to meet requirements on charging voltage of dual cells coupled in series, the output voltage/output current of the first charging channel is required to be maintained at 10V/2A. In this way, the wireless power transmitting circuit generates an electromagnetic signal based on 10V/2A, and accordingly, the wireless power receiving circuit converts the electromagnetic signal into the output voltage/output current of 10V/2A. Since current is decreased to 2A from 4A, it is possible to reduce heat generation during electrical energy transmission. Therefore, multiple cells coupled in series can be adopted, to reduce heat generated by the wireless power transmitting circuit and the wireless power receiving circuit.

The value of N may be 3, or a positive integer greater than 3. A large number of cells coupled in series lead to low heat generated when electrical energy flows through the wireless power transmitting circuit and the wireless power receiving circuit.

According to implementations, in order to ensure charging speed and further reduce heating of the device to-be-charged 230, the structure of the battery of the device to-be-charged 230 is modified by introducing multiple cells coupled in series. Compared with a single-cell scheme, in order to achieve an equal charging speed, a charging current required by multiple cells is 1/N time a charging current required by a single cell (N is the number of cells coupled in series in the device to-be-charged). In other words, under the same charging speed, by adopting multiple cells coupled in series, it is possible to substantially decrease a charging current, thereby further decreasing the amount of heat generated by the device to-be-charged during charging.

The multiple cells of implementations can be cells with the same or similar specification or parameter. Cells with the same or similar specification can facilitate unified management. On the other hand, the overall performance and service life of multiple cells can be improved by adopting cells with the same or similar specification or parameter.

During charging, electrical energy outputted by the first charging channel or the second charging channel can be used for charging multiple cells coupled in series. During power supply, a voltage across the multiple cells can be decreased by a buck circuit to power a system of the device to-be-charged. Alternatively, a single cell can be used to power the system.

To keep balance of an electric quantity of each of the multiple cells, a balancing circuit can be used for balancing the electric quantity of each of the multiple cells during charging and discharging. The balancing circuit can be implemented in various manners. For example, a load can be coupled between two ends of a cell to consume electric quantity of the cell, such that the electric quantity of the cell is equal to that of other cells and as such, the voltage of each of the multiple cells is equal. Alternatively, for balancing, a cell with high electric quantity can be made to charge a cell with low electric quantity until the voltage across each of the multiple cells is equal.

Charging of the battery may include one or more of a trickle charging stage, a constant-current charging stage, and a constant-voltage charging stage. According to implementations, in order to further increase charging speed, through control of a charging voltage and a charging current, charging duration of the constant-voltage charging stage can be shortened or the constant-voltage charging stage can be omitted. Therefore, compared with the related art, it is possible to substantially increase charging speed.

According to implementations, during wireless charging of the device to-be-charged according to the adjusted wireless charging signal, the device to-be-charged can detect a present charging status and a present voltage across the battery. If the present charging status is constant-voltage charging, and the present voltage across the battery is higher than or equal to a preset cut-off voltage, the device to-be-charged can be charged according to a limiting voltage and a pre-stored current-parameter sequence.

According to implementations, the preset cut-off voltage is lower than the limiting voltage. The pre-stored current-parameter sequence includes current parameters $I1, I2, I3, \ldots, In$ in a descending value order, where n is a natural number greater than or equal to 1.

A limiting voltage which is higher than the preset cut-off voltage of the battery, and the pre-stored current-parameter sequence $[I1, I2, I3, \ldots, In]$ can be set, where $n \geq 1$ and $I1 \geq I2 \geq I3 \ldots In$. It should be understood that, the limiting voltage is related to the system of the battery, the material of the battery, and the like. For example, if the preset cut-off voltage of the battery is V0, and the limiting voltage is Vn, Vn can be set to be V0+□V, where □V may be, for example, 0.05V~0.1V. Charging currents $I1, I2, \ldots, In$ are also related to the system of the battery, the material of the battery, and the like.

The capacity of the battery can be determined once the system of the battery is determined. If the charging voltage is equal to the limiting voltage, charging currents corresponding to different stages can be determined according to a relationship between charging voltage, charging current, charging time, and capacity of the battery. A difference between each two adjacent charging currents of $I1, I2, I3, \ldots, In$ can be set to be □I, where □I may be, for example, 100 mA~1A.

As an example, no matter whether charging is performed through the first charging channel or the second charging channel, when the battery is charged until the charging voltage of the battery reaches the preset cut-off voltage, charging current I1 is applied to the battery for constant-current charging until the charging voltage of the battery reaches the limiting voltage. Since a voltage across the battery will drop when stopping applying charging current I1 to the battery for constant-current charging, charging current I2 can be then applied to the battery for constant-current charging until the charging voltage of the battery reaches the limiting voltage. The above steps are repeated, until charging current In corresponding to a final charging stage is applied for charging until the charging voltage of the battery reaches the limiting voltage, and then charging ends. In this way, by setting the limiting voltage and charging current corresponding to each stage, it is possible to omit the constant-voltage charging stage in the related art, thereby substantially saving charging time.

In other words, when the battery is charged until the charging voltage of the battery reaches the preset cut-off voltage, the battery is then charged through multiple charging stages. Each of the multiple charging stages corresponds to one charging current. For two adjacent charging stages, a charging current corresponding to a former charging stage is larger than that corresponding to a latter charging stage. In each of the multiple charging stages, the charging current corresponding to the charging stage is applied to the battery for charging until the voltage across the battery reaches the limiting voltage, where the limiting voltage is higher than the preset cut-off voltage of the battery. When the multiple charging stages are completed, charging ends.

As another example, no matter whether charging is performed through the first charging channel or the second charging channel, when the battery is charged until the voltage across the battery reaches the preset cut-off voltage, charging current I1 is applied to the battery for constant-current charging until the charging voltage of the battery reaches the limiting voltage. Then charging current I2 is applied to the battery for constant-current charging until the charging voltage of the battery reaches the limiting voltage. The above steps are repeated, until charging current In corresponding to a final charging stage is applied for charging until the charging voltage of the battery reaches the limiting voltage. Then Vn (that is, the limiting voltage) is taken as a charging voltage to be applied for constant-voltage charging for a preset duration or until the charging current decreases to a preset value, and then charging ends. Compared with the previous example in which the constant-voltage charging stage is omitted, in the above example, a charging cut-off voltage is increased and duration of constant-voltage charging is shortened. Therefore, compared with the related art, by adopting the above manner, it is possible to substantially save charging time.

In other words, when the battery is charged until the charging voltage of the battery reaches the preset cut-off voltage, the battery is then charged through multiple charging stages. Each of the multiple charging stages corresponds to one charging current. For two adjacent charging stages, a charging current corresponding to a former charging stage is larger than that corresponding to a latter charging stage. In each of the multiple charging stages, a charging current corresponding to the charging stage is applied to the battery for charging until the voltage across the battery reaches the limiting voltage, where the limiting voltage is higher than the preset cut-off voltage of the battery. Then the limiting voltage is applied to the battery for constant-voltage charging, until the charging current of the battery reaches a target cut-off current of constant-voltage charging or charging duration reaches a preset duration, and then charging ends.

When the battery includes multiple cells, it is necessary to detect whether a voltage across each of the multiple cells reaches the preset cut-off voltage or the limiting voltage. When a voltage across any one of the multiple cells reaches the preset cut-off voltage or the limiting voltage, charging current switching is performed (that is, switching to a charging current corresponding to a latter charging stage from a charging current corresponding to a former charging stage). Alternatively, a charging path of a cell, of which the voltage reaches the preset cut-off voltage or the limiting voltage, can be cut off, and other cells, of which the voltage has not reached the preset cut-off voltage or the limiting voltage, can continue to be charged. In other words, charging can be performed separately on each of the multiple cells through the above charging process.

In the wireless charging method provided herein, the method is applicable to the device to-be-charged. The device to-be-charged includes the wireless power receiving circuit. The method includes the following. During wireless charging, the output current of the wireless power receiving circuit and the charging voltage and/or the charging current of the battery are detected. The target charging power is determined according to the charging voltage and/or the charging current of the battery, and the target charging current is determined according to the output current of the wireless power receiving circuit. The adjustment request is sent to the power supply device, where the adjustment request carries the target charging power and/or the target charging current. The adjusted wireless charging signal is received from the wireless charging apparatus. As can be seen, the device to-be-charged determines the target charging power according to the charging voltage and/or the charging current of the battery, and determines the target charging current according to the output current of the wireless power receiving circuit. Then the device to-be-charged sends to the power supply device the adjustment request carrying the target charging power and/or the target charging current and receives the adjusted wireless charging signal sent by the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery to adjust in real time the charging power, not only can a high charging power be obtained by feeding back the charging parameter of the battery, but also can a small voltage difference be ensured by feeding back the output current of the wireless power receiving circuit, which can substantially improve wireless charging efficiency while reducing heating during wireless charging of the device to-be-charged by the wireless charging apparatus.

In some implementations, the charging parameter of the battery includes a current of the battery. When the charging status is constant-current charging, the device to-be-charged determines the target charging power according to the charging voltage and/or the charging current of the battery as follows.

At block 102a, a preset threshold current corresponding to the charging status is obtained.

According to implementations, if the charging status is constant-current charging, after detecting the charging voltage and/or the charging current of the battery, the device to-be-charged can obtain the preset threshold current corresponding to the charging status.

The preset threshold current is conducive to improving efficiency in charging the battery. The preset output-current range is conducive to reducing the voltage difference of the charging management module, to improve charging efficiency and reduce heating.

According to implementations, the device to-be-charged can establish in advance a correspondence relationship between the charging status and a preset threshold voltage and/or a preset threshold current of the battery, and a correspondence relationship between the charging status and an output-current range.

In addition, for different charging statuses, the device to-be-charged can set different threshold output currents and different preset threshold voltages and/or preset threshold currents of the battery.

At block 102b, the target charging power is determined according to the preset threshold current and the charging voltage of the battery.

According to implementations, if the charging status is constant-current charging, after detecting the charging current of the battery and obtaining the preset threshold current, the device to-be-charged can determine the target charging power according to the preset threshold current and the charging voltage of the battery.

The device to-be-charged can obtain a product of the charging voltage of the battery and the preset threshold current as the target charging power.

The device to-be-charged can compare the charging current of the battery with the preset threshold current, and compare the output current of the wireless power receiving circuit with the preset output-current range, to determine, according to the above two comparison results, whether power adjustment is required.

If the charging current of the battery is smaller than the preset threshold current, the device to-be-charged may consider that the charging current of the battery fails to meet preset requirements on charging power, and thus power adjustment is required.

If the output current of the wireless power receiving circuit is beyond the preset output-current range, the device to-be-charged may consider that the output current of the wireless power receiving circuit fails to meet not only the preset requirements on charging power but also preset requirements on a small voltage difference and thus is likely to cause heating, and therefore, power adjustment is required.

After the device to-be-charged compares the charging current of the battery with the preset threshold current and compares the output current of the wireless power receiving circuit with the preset output-current range, if the charging current of the battery is smaller than the preset threshold current, and the output current of the wireless power receiving circuit is beyond the preset output-current range, the device to-be-charged determines that power adjustment is required. If the charging current of the battery is larger than or equal to the preset threshold current, or the output current of the wireless power receiving circuit is within the preset output-current range, the device to-be-charged determines that there is no need for power adjustment.

In other implementations, the charging parameter of the battery includes the voltage across the battery. When the charging status is constant-voltage charging, the device to-be-charged determines the target charging power according to the charging voltage and/or charging current of the battery as follows.

At block 102c, a preset threshold voltage corresponding to the charging status is obtained.

According to implementations, if the charging status is constant-voltage charging, after detecting the charging voltage and/or the charging current of the battery, the device to-be-charged can obtain the preset threshold voltage corresponding to the charging status.

The preset threshold voltage is conducive to improving efficiency in charging the battery.

At block 102d, the target charging power is determined according to the preset threshold voltage and the charging current of the battery.

According to implementations, if the charging status is constant-voltage charging, after detecting the charging voltage of the battery and obtaining the preset threshold voltage, the device to-be-charged can determine the target charging power according to the preset threshold voltage and the charging current of the battery.

The device to-be-charged can obtain a product of the charging current of the battery and the preset threshold voltage as the target charging power.

The device to-be-charged can compare the charging voltage of the battery with the preset threshold voltage, and compare the output current of the wireless power receiving circuit with the preset output-current range, to determine, according to the above two comparison results, whether power adjustment is required.

If the charging voltage of the battery is lower than the preset threshold voltage, the device to-be-charged may consider that the charging voltage of the battery fails to meet preset requirements on charging power, and thus power adjustment is required.

If the output current of the wireless power receiving circuit is beyond the preset output-current range, the device to-be-charged may consider that the output current of the wireless power receiving circuit fails to meet not only the preset requirements on charging power but also preset requirements on a small voltage difference and thus is likely to cause heating, and therefore, power adjustment is required.

After the device to-be-charged compares the charging voltage of the battery with the preset threshold voltage, and compares the output current of the wireless power receiving circuit with the preset output-current range, if the charging voltage of the battery is lower than the preset threshold voltage, and the output current of the wireless power receiving circuit is beyond the preset output-current range, the device to-be-charged determines that power adjustment is required. If the charging voltage of the battery is higher than or equal to the preset threshold voltage, or the output current of the wireless power receiving circuit is within the preset output-current range, the device to-be-charged determines that there is no need for power adjustment.

In some implementations, the device to-be-charged further includes the charging management module, and wireless charging is performed on the device to-be-charged according to the adjusted wireless charging signal as follows.

At block 201, the wireless power receiving circuit outputs a target output current and a target output voltage according to the adjusted wireless charging signal.

According to implementations, after receiving the adjusted wireless charging signal from the wireless charging apparatus, the wireless power receiving circuit of the device to-be-charged can output the target output current and the target output voltage according to the adjusted wireless charging signal.

After receiving the adjusted wireless charging signal, the wireless power receiving circuit of the device to-be-charged can output the target output current and the target output voltage according to the charging voltage and the charging current, and transmit the target output voltage and the target output current to the charging management module of the device to-be-charged.

At block 202, the charging management module converts the target output current and the target output voltage and apply the converted target output current and the converted target output voltage to the battery for charging.

According to implementations, after the charging management module of the device to-be-charged converts the target charging current and the target output voltage, the target charging current and the target output voltage subjected to conversion can be applied to the battery for charging.

After receiving the target output current and the target output voltage outputted by the wireless power receiving circuit, the charging management module converts the target output current and the target output voltage, to obtain a converted charging current and a converted charging voltage to be applied to the battery for charging.

In the wireless charging method provided herein, the method is applicable to the device to-be-charged. The device to-be-charged includes the wireless power receiving circuit. The method includes the following. During wireless charging, the output current of the wireless power receiving circuit and the charging voltage and/or the charging current of the battery are detected. The target charging power is determined according to the charging voltage and/or the charging current of the battery, and the target charging current is determined according to the output current of the wireless power receiving circuit. The adjustment request is sent to the power supply device, where the adjustment request carries the target charging power and/or the target charging current. The adjusted wireless charging signal is received from the wireless charging apparatus. As can be seen, the device to-be-charged determines the target charging power according to the charging voltage and/or the charging current of the battery, and determines the target charging current according to the output current of the wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery for real-time adjustment of the charging power, not only can a high charging power be obtained by feeding back the charging parameter of the battery, but also can a small voltage difference be ensured by feeding back the output current of the wireless power receiving circuit. In this way, during wireless charging of the device to-be-charged by the wireless charging apparatus, in addition to reducing heating, wireless charging efficiency can be substantially improved.

Figure 5:
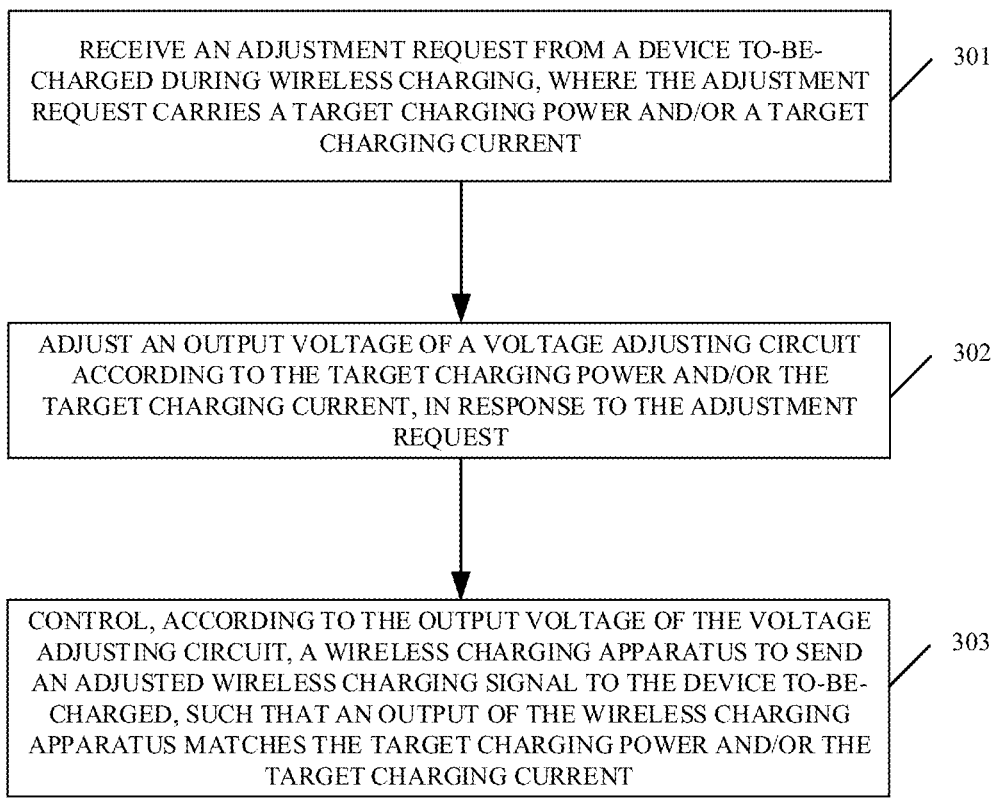
FIG. 5 is a schematic flowchart of a wireless charging method according to other implementations.

Implementations provide a wireless charging method. The method is applicable to a power supply device. FIG. 5 is a schematic flowchart of a wireless charging method according to other implementations. As illustrated in FIG. 5, the method implemented by the power supply device includes the following.

At block 301, during wireless charging, a charging status is determined, and an adjustment request is received from a device to-be-charged, where the adjustment request carries a target charging power and/or a target charging current.

According to implementations, during wireless charging, the power supply device receives the adjustment request sent by the device to-be-charged.

The adjustment request carries the target charging power and/or the target charging current required by the device to-be-charged.

In some implementations, the adjustment request further carries a present charging power and a power difference.

According to implementations, during wireless charging, the power supply device detects the charging status, where the charging status may include trickle charging, constant-current charging, and constant-voltage charging.

The power supply device may be part of a wireless charging system. The wireless charging system may further include the device to-be-charged and a wireless charging apparatus. The wireless charging apparatus performs wireless charging on the device to-be-charged by establishing a wireless connection with the device to-be-charged. For example, the wireless charging apparatus may be a wireless charging base. The power supply device may be configured to power the wireless charging apparatus. The power supply device may be an adaptor, a power supply, etc.

As illustrated in FIG. 2, the wireless charging system includes the power supply device, the wireless charging apparatus, and the device to-be-charged. The wireless charging apparatus includes a voltage converter, a wireless power transmitting circuit, and a first control unit. The device to-be-charged includes a wireless power receiving circuit, a charging management module, a second control unit, and a battery. The power supply device may include a voltage adjusting circuit.

The power supply device can establish a wireless communication with the device to-be-charged, thereby achieving two-way data transmission.

The power supply device of the wireless charging system may be a voltage-adjustable power supply device. The power supply device may be provided with the voltage adjusting circuit, and as such, an output voltage of the power supply device can be adjusted in real time via the voltage adjusting circuit.

Before wireless charging, the device to-be-charged can establish a wireless connection and perform two-way communication with both the wireless charging apparatus and the power supply device, thereby achieving wireless charging.

According to implementations, the power supply device can be configured to power the wireless charging apparatus. The power supply device may be coupled with the wireless charging apparatus via a USB interface. The USB interface may be a common USB interface, or may be a micro USB interface or Type C interface. A power line of the USB interface is used for powering the wireless charging apparatus by the power supply device. The power line may be a VBus line and/or a ground line of the USB interface. A data line of the USB interface is used for two-way communication between the power supply device and the wireless charging apparatus. The data line may be a D+ line and/or a D− line of the USB interface. "Two-way communication" may refer to exchange of information between the power supply device and wireless charging apparatus.

According to implementations, wireless communication between the device to-be-charged and the wireless charging apparatus can be performed in one or more of the following manners: Bluetooth®, Wi-Fi, high-carrier-frequency based short-distance wireless communication, optical communication, ultrasonic communication, ultra-wideband communication, or mobile communication.

At block 302, in response to the adjustment request, an output voltage of the voltage adjusting circuit is adjusted according to the target charging power and/or the target charging current.

According to implementations, after receiving the adjustment request from the device to-be-charged, in response to the adjustment request, the power supply device can adjust the output voltage of the voltage adjusting circuit according to the target charging power and/or the target charging current.

In addition to taking into consideration whether a charging parameter of the battery of the device to-be-charged satisfies a preset charging power, the power supply device needs to further take into consideration whether an output current of the wireless power receiving circuit of the device to-be-charged satisfies a preset current range. In other words, in the wireless charging method provided herein, when adjusting the output voltage of the voltage adjusting circuit, the power supply device needs to control a voltage difference of the charging management module of the device to-be-charged while ensuring high charging efficiency.

In some implementations, after receiving the adjustment request sent by the device to-be-charged, the power supply device can adjust the output voltage of the voltage adjusting circuit according to the target charging power and/or the target charging current, the present charging power, and the power difference.

At block 303, according to the output voltage of the voltage adjusting circuit, the wireless charging apparatus is controlled to send an adjusted wireless charging signal to the device to-be-charged, such that an output of the wireless charging apparatus matches the target charging power and/or the target charging current.

According to implementations, after adjusting the output voltage of the voltage adjusting circuit according to the target charging power and/or the target charging current, the power supply device controls, according to the output voltage of the voltage adjusting circuit, the wireless charging apparatus to send the adjusted wireless charging signal to the device to-be-charged, such that the output of the wireless charging apparatus matches the target charging power and/or the target charging current.

After adjusting the output voltage of the voltage adjusting circuit, the power supply device needs to control the voltage adjusting circuit thereof according to the output voltage of the voltage adjusting circuit, to control the wireless charging apparatus to send the adjusted wireless charging signal to the device to-be-charged, such that the output of the wireless charging apparatus matches the target charging power and/or the target charging current.

After receiving from the device to-be-charged feedback information on wireless charging, the power supply device can control the voltage adjusting circuit according to the feedback information, to adjust an output voltage of the power supply device (that is, adjust an input voltage and an input current of the wireless power transmitting circuit), thereby achieving power adjustment during wireless charging of the device to-be-charged.

After determining the adjusted wireless charging signal, the wireless charging apparatus needs to control the voltage converter thereof, to adjust an output voltage and an output current of the voltage converter, such that an input voltage and an input current of the wireless power transmitting circuit match the adjusted wireless charging signal.

After receiving from the device to-be-charged feedback information on wireless charging, the wireless charging apparatus can control the voltage converter according to the feedback information, to adjust the output voltage and the output current of the voltage converter (that is, adjust the input voltage and the input current of the wireless power transmitting circuit), thereby achieving power adjustment during wireless charging of the device to-be-charged, such that the output of the wireless charging apparatus matches the target charging power and/or the target charging current.

Before the wireless charging apparatus performs wireless charging on the device to-be-charged, the device to-be-charged can determine a charging mode through wireless communication with the wireless charging apparatus. The charging mode may include a first wireless charging mode and a second wireless charging mode, where a charging speed in the first wireless charging mode is higher than that in the second wireless charging mode.

According to implementations, in wireless charging of the device to-be-charged performed by the wireless charging apparatus, a wireless power transmitting circuit is operable in the first wireless charging mode and the second wireless charging mode. A charging speed at which the wireless power transmitting circuit charges the device to-be-charged in the first wireless charging mode is higher than that in the second wireless charging mode. In other words, compared with the wireless power transmitting circuit working in the second wireless charging mode, the wireless power transmitting circuit working in the first wireless charging mode takes less time to fully charge a battery of the same capacity of the device to-be-charged.

The second wireless charging mode can be referred to as a normal wireless charging mode and can be, for example, a conventional wireless charging mode based on the QI standard, the PMA standard, or the A4WP standard. The first wireless charging mode can be referred to as a quick wireless charging mode. The normal wireless charging mode can refer to a wireless charging mode in which the wireless power transmitting circuit has a low transmission power (usually lower than 15 W, and the commonly used transmission power is 5 W or 10 W). In the normal wireless charging mode, it usually takes several hours to fully charge a battery of high capacity (such as 3000 mA). However, in the quick wireless charging mode, the transmission power of the wireless power transmitting circuit is relatively high (usually higher than or equal to 15 W). Compared with the normal wireless charging mode, in the quick wireless charging mode, it takes substantially less charging time for the wireless power transmitting circuit to fully charge a battery of the same capacity, and the charging is faster.

When outputting a charging voltage and a charging current to the device to-be-charged according to the adjusted wireless charging signal, the wireless charging apparatus may output, in the first wireless charging mode, the charging voltage and the charging current to the device to-be-charged according to the adjusted wireless charging signal, or may output, in the second wireless charging mode, the charging voltage and the charging current to the device to-be-charged according to the adjusted wireless charging signal.

In the wireless charging method provided herein, the method is applicable to the power supply device. The power supply device includes the voltage adjusting circuit. The method includes the following. During wireless charging, the power supply device receives the adjustment request from the device to-be-charged, where the adjustment request carries the target charging power and/or the target charging current. In response to the adjustment request, the power supply device adjusts the output voltage of the voltage adjusting circuit according to the target charging power and/or the target charging current. According to the output voltage of the voltage adjusting circuit, the power supply device controls the wireless charging apparatus to send the adjusted wireless charging signal to the device to-be-charged, such that the output of the wireless charging apparatus matches the target charging power and/or the target charging current. As can be seen, the device to-be-charged determines the target charging power according to a charging voltage and/or a charging current of the battery, and determines the target charging current according to the output current of the wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery to adjust in real time the charging power, not only can a high charging power be obtained by feeding back the charging parameter of the battery, but also can a small voltage difference be ensured by feeding back the output current of the wireless power receiving circuit, which can substantially improve wireless charging efficiency while reducing heating during wireless charging of the device to-be-charged by the wireless charging apparatus.

Figure 6:
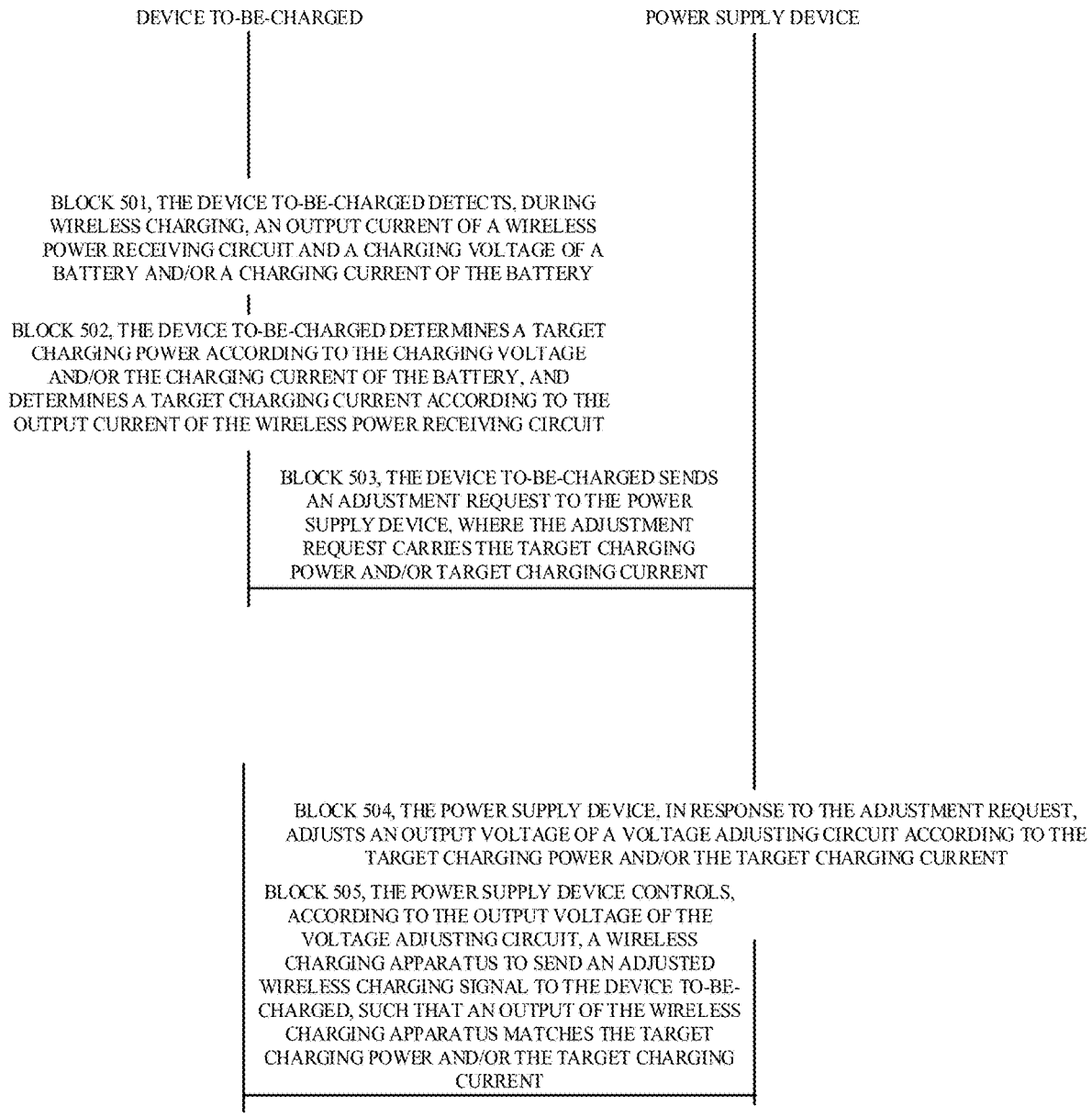
FIG. 6 is a schematic flowchart of a wireless charging method according to other implementations.

Based on the foregoing implementations, a wireless charging method is provided. The method is applicable to a device to-be-charged and a power supply device of a wireless charging system. FIG. 6 is a schematic flowchart of a wireless charging method according to other implementations. As illustrated in FIG. 6, the method implemented by the power supply device and the device to-be-charged includes the following.

At block 501, during wireless charging, the device to-be-charged detects an output current of a wireless power receiving circuit and a charging voltage of a battery and/or a charging current of the battery.

According to implementations, during wireless charging, the device to-be-charged detects the output current of the wireless power receiving circuit and the charging voltage and/or the charging current of the battery.

A charging status in wireless charging of the device to-be-charged may include trickle charging, constant-current charging, and constant-voltage charging.

The device to-be-charged may be part of the wireless charging system. The wireless charging system may include a wireless charging apparatus and the power supply device. The wireless charging apparatus performs wireless charging on the device to-be-charged by establishing a wireless connection with the device to-be-charged.

At block 502, the device to-be-charged determines a target charging power according to the charging voltage and/or the charging current of the battery, and determines a target charging current according to the output current of the wireless power receiving circuit.

According to implementations, after detecting the output current of the wireless power receiving circuit and the charging voltage and/or the charging current of the battery, the device to-be-charged determines the target charging power according to the charging voltage and/or the charging current of the battery, and determines the target charging current according to the output current of the wireless power receiving circuit.

According to implementations, in addition to taking into consideration whether a charging parameter of the battery satisfies a preset charging power, the device to-be-charged needs to further take into consideration whether the output current of the wireless power receiving circuit satisfies a preset current range. In other words, in the wireless charging method provided herein, when determining whether power adjustment is required, the following two aspects should be considered: (i) whether charging efficiency can be ensured, and (ii) whether a voltage difference of a charging management module is controlled to be small values.

At block 503, the device to-be-charged sends an adjustment request to the power supply device, where the adjustment request carries the target charging power and/or target charging current.

According to implementations, upon determining that power adjustment is required, the device to-be-charged sends the adjustment request to the power supply device.

The adjustment request carries the target charging power and/or target charging current.

At block 504, in response to the adjustment request, the power supply device adjusts an output voltage of a voltage adjusting circuit according to the target charging power and/or the target charging current.

According to implementations, after receiving the adjustment request from the device to-be-charged, in response to the adjustment request, the power supply device adjusts the output voltage of the voltage adjusting circuit according to the target charging power and/or the target charging current.

In addition to taking into consideration whether the charging parameter of the battery of the device to-be-charged satisfies the preset charging power, the power supply device needs to further take into consideration whether the output current of the wireless power receiving circuit of the device to-be-charged satisfies the preset current range. In other words, in the wireless charging method provided herein, when adjusting the output voltage of the voltage adjusting circuit, the power supply device needs to control a voltage difference of the charging management module of the device to-be-charged while ensuring high charging efficiency.

After acquiring the target charging power and/or the target charging current, the wireless charging apparatus needs to control a voltage converter thereof, to adjust an output voltage and an output current of the voltage converter, such that an input voltage and an input current of a wireless power transmitting circuit match the target charging power and/or the target charging current.

At block 505, according to the output voltage of the voltage adjusting circuit, the power supply device controls the wireless charging apparatus to send an adjusted wireless charging signal to the device to-be-charged, such that an output of the wireless charging apparatus matches the target charging power and/or the target charging current.

According to implementations, after adjusting the output voltage of the voltage adjusting circuit according to the target charging power and/or the target charging current, the power supply device controls, according to the output voltage of the voltage adjusting circuit, the wireless charging apparatus to send the adjusted wireless charging signal to the device to-be-charged, such that the output of the wireless charging apparatus matches the target charging power and/or the target charging current.

According to implementations, after sending the adjustment request to the wireless charging apparatus, the device to-be-charged receives the adjusted wireless charging signal from the wireless charging apparatus, and wireless charging is performed according to the adjusted wireless charging signal.

According to implementations, after determining the adjusted wireless charging signal, the wireless charging apparatus can output, via the wireless power transmitting circuit, the adjusted wireless charging signal to the device to-be-charged.

In the wireless charging method provided herein, the method is applicable to the device to-be-charged and the power supply device. The device to-be-charged includes the wireless power receiving circuit. The method includes the following. During wireless charging, the output current of the wireless power receiving circuit and the charging voltage and/or the charging current of the battery are detected. The target charging power is determined according to the charging voltage and/or the charging current of the battery, and the target charging current is determined according to the output current of the wireless power receiving circuit. The adjustment request is sent to the power supply device, where the adjustment request carries the target charging power and/or the target charging current. The adjusted wireless charging signal is received from the wireless charging apparatus. As can be seen, the device to-be-charged determines the target charging power according to the charging voltage and/or the charging current of the battery, and determines the target charging current according to the output current of the wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery to adjust in real time the charging power, not only can a high charging power be obtained by feeding back the charging parameter of the battery, but also can a small voltage difference be ensured by feeding back the output current of the wireless power receiving circuit. In this way, during wireless charging of the device to-be-charged by the wireless charging apparatus, in addition to reducing heating, wireless charging efficiency can be substantially improved.

Figure 7:
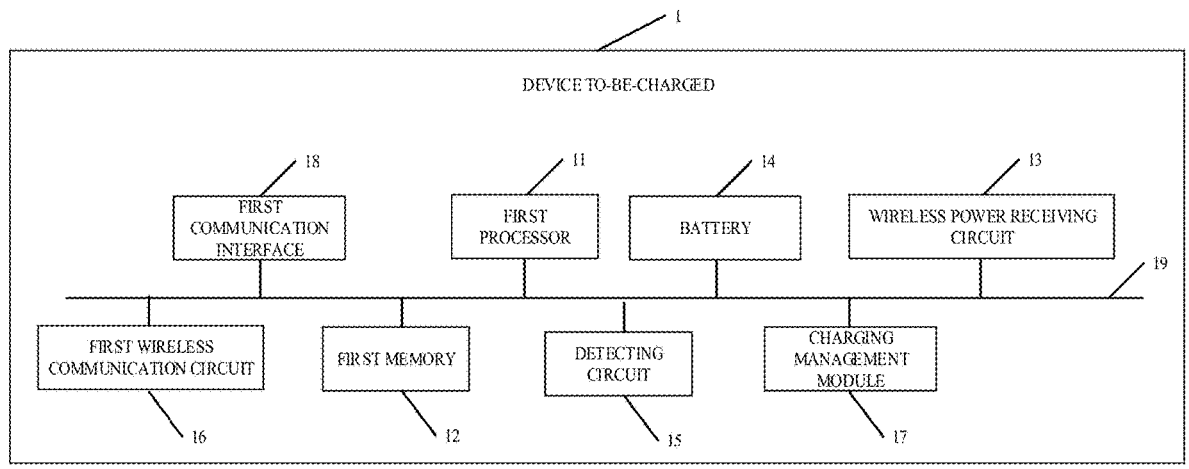
FIG. 7 is a schematic structural diagram of a device to-be-charged according to implementations.

Based on the foregoing implementations, FIG. 7 is a schematic structural diagram of a device to-be-charged according to implementations. As illustrated in FIG. 7, the device to-be-charged 1 of implementations includes a first processor 11, a first memory 12 configured to store instructions executable by the first processor 11, a wireless power receiving circuit 13, a battery 14, a detecting circuit 15, a first wireless communication circuit 16, and a charging management module 17.

The detecting circuit 15 is configured to detect, during wireless charging, an output current of the wireless power receiving circuit and a charging voltage of the battery and/or a charging current of the battery. The first processor 11 is configured to determine a target charging power according to the charging voltage and/or the charging current of the battery, and determine a target charging current according to the output current of the wireless power receiving circuit. The first wireless communication circuit 16 is configured to send an adjustment request to a power supply device, where the adjustment request carries the target charging power and/or the target charging current. The wireless power receiving circuit 13 is configured to receive from a wireless charging apparatus an adjusted wireless charging signal, and wireless charging is performed according to the adjusted wireless charging signal.

In some implementations, the first processor 11 is further configured to operate as follows after determining the target charging power according to the charging voltage and/or the charging current of the battery. The first processor 11 is configured to determine a present charging power according to the charging voltage and/or the charging current of the battery. The first processor 11 is configured to determine a power difference according to the target charging power and the present charging power.

In some implementations, the adjustment request further carries the present charging power and the power difference.

In some implementations, the detecting circuit 15 is further configured to detect a charging status.

In some implementations, the first processor 11 is configured to, when the charging status is constant-current charging, obtain a preset threshold current corresponding to the charging status, and determine the target charging power according to the preset threshold current and the charging voltage of the battery. The first processor 11 is further configured to, when the charging status is constant-voltage charging, obtain a preset threshold voltage corresponding to the charging status, and determine the target charging power according to the preset threshold voltage and the charging current of the battery.

In some implementations, the wireless power receiving circuit 13 is configured to output a target output current and a target output voltage according to the adjusted wireless charging signal. The charging management module 17 is configured to convert the target output current and the target output voltage, and charge the battery 14.

In some implementations, the wireless power receiving circuit 13 is further configured to determine a charging mode through wireless communication with the wireless charging apparatus, where the charging mode includes a first wireless charging mode and a second wireless charging mode, and a charging speed in first wireless charging mode is higher than that in the second wireless charging mode.

In some implementations, the charging management module 17 is configured to charge the battery 14 in the first wireless charging mode, or charge the battery 14 in the second wireless charging mode. Accordingly, the charging management module 17 is configured to charge the battery 14 through a first charging channel corresponding to the first wireless charging mode, or charge the battery 14 through a second charging channel corresponding to the second wireless charging mode.

In some implementations, the battery 14 is a single-cell battery or a multi-cell battery, and the multi-cell battery includes multiple cells coupled in series. Accordingly, buck conversion is performed on an output voltage of the multi-cell battery during power supply of the multi-cell battery.

In some implementations, the charging management module 17 is further configured to operate as follows. The charging management module 17 is configured to, during wireless charging, charge the battery through multiple charging stages when the charging voltage of the battery reaches a preset cut-off voltage, where each of the multiple charging stages corresponds to one charging current; for two adjacent charging stages, a charging current corresponding to a former charging stage is larger than that corresponding to a latter charging stage; and in each of the multiple charging stages, a charging current corresponding to the charging stage is applied for charging until a voltage across the battery reaches a limiting voltage, where the limiting voltage is higher than the preset cut-off voltage of the battery. The charging management module 17 is configured to end charging when the multiple charging stages are completed.

In other implementations, the charging management module 17 is further configured to operate as follows. The charging management module 17 is configured to, during wireless charging, charge the battery through multiple charging stages when the charging voltage of the battery reaches a preset cut-off voltage, where each of the multiple charging stages corresponds to one charging current; for two adjacent charging stages, a charging current corresponding to a former charging stage is larger than that corresponding to a latter charging stage; and in each of the multiple charging stages, a charging current corresponding to the charging stage is applied for charging until a voltage across the battery reaches a limiting voltage, where the limiting voltage is higher than the preset cut-off voltage of the battery. The charging management module 17 is configured to apply the limiting voltage to the battery for constant-voltage charging until the charging current of the battery reaches a target cut-off current of constant-voltage charging or a charging duration reaches a preset duration, and end charging.

According to implementations, the first processor 11 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It can be understood that, for different apparatuses, electronic devices for implementing a function of the processor may be other devices, which is not limited herein. The first memory 12 is configured to store executable program codes. The executable program codes include instructions operable with a computer. The first memory 12 may include a high speed random-access memory (RAM), or may further include a non-volatile memory, for example, at least two magnetic storage devices.

The device to-be-charged may further include a first communication interface 18 and a first bus 19. The first bus 19 is configured for connection and communication between the first communication interface 18, the first processor 11, and the first memory 12.

The first memory 12 is configured to store instructions and data.

In the device to-be-charged provided herein, the device to-be-charged includes the wireless power receiving circuit. During wireless charging, the device to-be-charged detects the output current of the wireless power receiving circuit and the charging voltage and/or the charging current of the battery. The device to-be-charged determines the target charging power according to the charging voltage and/or the charging current of the battery, and determines the target charging current according to the output current of the wireless power receiving circuit. The device to-be-charged sends the adjustment request to the power supply device, where the adjustment request carries the target charging power and/or the target charging current. The device to-be-charged receives the adjusted wireless charging signal from the wireless charging apparatus. As can be seen, the device to-be-charged determines the target charging power according to the charging voltage and/or the charging current of the battery, and determines the target charging current according to the output current of the wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, the charging power can be adjusted. By feeding back to the wireless charging apparatus the output current of the wireless power receiving circuit and the charging voltage and/or the charging current of the battery to adjust in real time the charging power, not only a high charging power can be obtained by feeding back a charging parameter of the battery, but also a small voltage difference can be ensured by feeding back the output current of the wireless power receiving circuit, which can substantially improve wireless charging efficiency while reducing heating during wireless charging of the device to-be-charged by the wireless charging apparatus.

Figure 8:
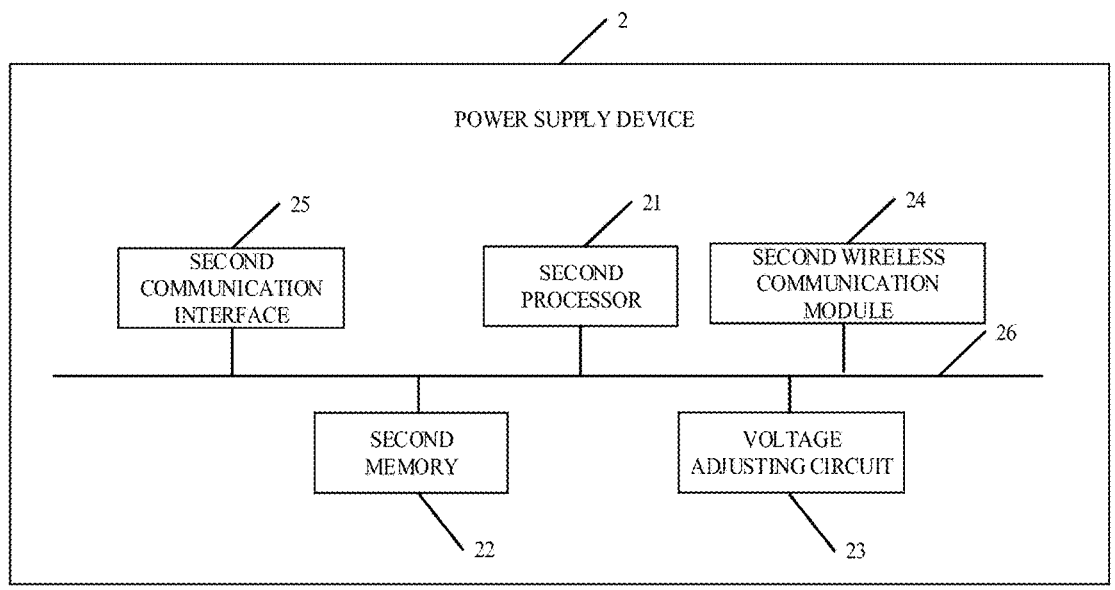
FIG. 8 is a schematic structural diagram of a power supply device according to implementations.

Based on the foregoing implementations, FIG. 8 is a schematic structural diagram of a power supply device according to implementations. As illustrated in FIG. 8, the power supply device 2 includes a second processor 21, a second memory 22 configured to store instructions executable by the second processor 21, a voltage adjusting circuit 23, and a second wireless communication module 24. The wireless charging apparatus 2 further includes a second communication interface 25 and a second bus 26 configured to couple the second processor 21, the second memory 22, and the second communication interface 25.

The second wireless communication module 24 is configured to receive an adjustment request from a device to-be-charged during wireless charging, where the adjustment request carries a target charging power and/or a target charging current. The second processor 21 is configured to, in response to the adjustment request, adjust an output voltage of a voltage adjusting circuit according to the target charging power and/or the target charging current. The voltage adjusting circuit 23 is configured to control, according to the output voltage of the voltage adjusting circuit, a wireless charging apparatus to send to the device to-be-charged an adjusted wireless charging signal, such that an output of the wireless charging apparatus matches the target charging power and/or the target charging current.

In some implementations, the adjustment request further includes a present charging power and a power difference.

In some implementations, the second processor 21 is further configured to adjust the output voltage of the voltage adjusting circuit according to the target charging power and/or the target charging current, the present charging power, and the power difference, after the second wireless communication module receives the adjustment request from the device to-be-charged.

According to implementations, the second processor 21 may be at least one of an ASIC, a DSP, a DSPD, a PLD, a FPGA, a CPU, a controller, a microcontroller, and a microprocessor. It can be understood that, for different apparatuses, electronic devices for implementing a function of the processor may be other devices, which is not limited herein. The second memory 22 is configured to store executable program codes. The executable program codes include instructions operable with a computer. The second memory 22 may include a high speed RAM, or may further include a non-volatile memory, for example, at least two magnetic storage devices.

The second bus 26 is configured for connection and communication between the second communication interface 25, the second processor 21, and the second memory 22.

The second memory 22 is configured to store instructions and data.

In the power supply device provided herein, the power supply device includes the voltage adjusting circuit. During wireless charging, the power supply device receives the adjustment request from the device to-be-charged, where the adjustment request carries the target charging power and/or the target charging current. In response to the adjustment request, the power supply device adjusts the output voltage of the voltage adjusting circuit according to the target charging power and/or the target charging current. According to the output voltage of the voltage adjusting circuit, the power supply device controls the wireless charging apparatus to send the adjusted wireless charging signal to the device to-be-charged, such that the output of the wireless charging apparatus matches the target charging power and/or the target charging current. As can be seen, the device to-be-charged determines the target charging power according to a charging voltage and/or a charging current of a battery, and determines the target charging current according to an output current of a wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery to adjust in real time the charging power, not only a high charging power can be obtained by feeding back a charging parameter of the battery, but also a small voltage difference can be ensured by feeding back the output current of the wireless power receiving circuit, which can substantially improve wireless charging efficiency while reducing heating during wireless charging of the device to-be-charged by the wireless charging apparatus.

In practice, the memory may be one or more of a first volatile memory such as a first RAM, or a first non-volatile memory such as a first read-only memory (ROM), a first flash memory, a hard disk drive (HDD), or a solid-state drive (SSD) and is configured to provide instructions and data to the processor.

Various functional units described in implementations herein may be integrated into one processing unit or may be present as a number of physically separated units, and two or more units may be integrated into one. The integrated unit may take the form of hardware or a software functional module.

If the integrated units are implemented as software functional modules and sold or used as standalone products, they may be stored in a computer readable storage medium. Based on such an understanding, the essential technical solution, or the portion that contributes to the prior art, or all or part of the technical solution of implementations may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a USB flash disk, a mobile hard drive, a ROM, a RAM, a magnetic disk, or an optical disk.

Implementations provide a first computer readable storage medium and a second computer readable storage medium. The first computer readable storage medium and the second computer readable storage medium each are configured to store programs which, when executed by a processor, are operable with the processor to perform the wireless charging methods described above.

The program instructions for performing the wireless charging methods may be stored in a storage medium such as an optical disk, a hard disk, a USB flash disk, etc. The program instructions for performing a wireless charging method stored in the storage medium, when read or executed by an electronic device, are operable with the electronic device to: detect, during wireless charging, an output current of a wireless power receiving circuit and a charging voltage of a battery and/or a charging current of the battery; determine a target charging power according to the charging voltage and/or the charging current of the battery, and determine a target charging current according to the output current of the wireless power receiving circuit; send an adjustment request to a power supply device, where the adjustment request carries the target charging power and/or the target charging current; and receive from a wireless charging apparatus an adjusted wireless charging signal, where wireless charging is performed according to the adjusted wireless charging signal.

The program instructions for performing a wireless charging method stored in the storage medium, when read or executed by an electronic device, are operable with the electronic device to: receive an adjustment request from a device to-be-charged during wireless charging, where the adjustment request carries a target charging power and/or a target charging current; in response to the adjustment request, adjust an output voltage of a voltage adjusting circuit according to the target charging power and/or the target charging current; and control, according to the output voltage of the voltage adjusting circuit, a wireless charging apparatus to send to the device to-be-charged an adjusted wireless charging signal, such that an output of the wireless charging apparatus matches the target charging power and/or the target charging current.

Those skilled in the art will understand that implementations herein can provide a method, a system, or a computer program product. Therefore, the disclosure may have hardware-only implementations, software-only implementations, or software plus hardware implementations. In addition, the disclosure may be implemented in the form of a computer program product embodied on one or more computer usable storage media (including but not limited to a magnetic storage device, an optical memory, and the like) including computer usable program codes.

The disclosure is described herein with reference to schematic flowcharts and/or block diagrams of methods, apparatuses (systems), and computer program products of implementations. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flowchart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, such that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

Implementations provide wireless charging methods, a device to-be-charged, a power supply device, and a storage medium. A wireless charging method is applicable to a device to-be-charged. The device to-be-charged includes a wireless power receiving circuit. The method includes the following. During wireless charging, an output current of the wireless power receiving circuit and a charging voltage of a battery and/or a charging current of the battery are detected. A target charging power is determined according to the charging voltage and/or the charging current of the battery, and a target charging current is determined according to the output current of the wireless power receiving circuit. An adjustment request is sent to a power supply device, where the adjustment request carries the target charging power and/or the target charging current. An adjusted wireless charging signal is received from a wireless charging apparatus. As can be seen, the device to-be-charged determines the target charging power according to the charging voltage and/or the charging current of the battery, and determines the target charging current according to the output current of the wireless power receiving circuit. The device to-be-charged then sends to the power supply device the adjustment request carrying the target charging power and/or the target charging current, and receives the adjusted wireless charging signal from the wireless charging apparatus, and wireless charging is performed according to the adjusted wireless charging signal. As such, charging power can be adjusted. By feeding back to the wireless charging apparatus the output current of the wireless power receiving circuit and the charging voltage and/or the charging current of the battery to adjust in real time the charging power, not only can a high charging power be obtained by feeding back a charging parameter of the battery, but also can a small voltage difference be ensured by feeding back the output current of the wireless power receiving circuit, which can substantially improve wireless charging efficiency while reducing heating during wireless charging of the device to-be-charged by the wireless charging apparatus.

What is claimed is:

1. A wireless charging method, being applicable to a device to-be-charged, the device to-be-charged comprising a wireless power receiving circuit, and the method comprising:
    detecting, during wireless charging, an output current of the wireless power receiving circuit and at least one of a charging voltage of a battery and a charging current of the battery;
    determining a target charging power according to the at least one of the charging voltage and the charging current of the battery, and determining a target charging current according to the output current of the wireless power receiving circuit;
    sending an adjustment request to a power supply device, wherein the adjustment request carries at least one of the target charging power and the target charging current; and
    receiving from a wireless charging apparatus an adjusted wireless charging signal and performing wireless charging according to the adjusted wireless charging signal;
    wherein the power supply device is configured to power the wireless charging apparatus, and the wireless charging apparatus is configured to charge the battery of the device to-be-charged.

2. The method of claim 1, further comprising:
    after determining the target charging power according to the at least one of the charging voltage and the charging current of the battery, determining a present charging power according to the at least one of the charging voltage and the charging current of the battery; and determining a power difference according to the target charging power and the present charging power.

3. The method of claim 2, wherein the adjustment request further carries the present charging power and the power difference.

4. The method of claim 1, wherein determining the target charging power according to the at least one of the charging voltage and the charging current of the battery comprises:

determining that the wireless charging is in a constant-current charging stage;

obtaining a preset threshold current corresponding to the constant-current charging stage; and determining the target charging power according to the preset threshold current and the charging voltage of the battery.

5. The method of claim 1, wherein determining the target charging power according to the at least one of the charging voltage and the charging current of the battery comprises:

determining that the wireless charging is in a constant-voltage charging stage;

obtaining a preset threshold voltage corresponding to the constant-voltage charging stage; and determining the target charging power according to the preset threshold voltage and the charging current of the battery.

6. The method of claim 1, wherein the device to-be-charged further comprises a charging management module, and performing wireless charging according to the adjusted wireless charging signal comprises:

outputting, by the wireless power receiving circuit, a target output current and a target output voltage according to the adjusted wireless charging signal; and converting, by the charging management module, the target output current and the target output voltage, and charging the battery.

7. The method of claim 1, further comprising:

before wireless charging, determining a charging mode through wireless communication with the wireless charging apparatus, wherein the charging mode comprises a first wireless charging mode and a second wireless charging mode, and a charging speed in first wireless charging mode is higher than that in the second wireless charging mode.

8. The method of claim 7, wherein charging the battery in the first wireless charging mode comprises one of:

charging the battery through a first charging channel corresponding to the first wireless charging mode; and charging the battery through a second charging channel corresponding to the second wireless charging mode.

9. The method of claim 1, further comprising:

during wireless charging, charging the battery through a plurality of charging stages when the charging voltage of the battery reaches a preset cut-off voltage, wherein each of the plurality of charging stages corresponds to one charging current; for two adjacent charging stages, a charging current corresponding to a former charging stage is larger than that corresponding to a latter charging stage; and in each of the plurality of charging stages, a charging current corresponding to the charging stage is applied for charging until a voltage across the battery reaches a limiting voltage, wherein the limiting voltage is higher than the preset cut-off voltage of the battery; and ending charging when the plurality of charging stages are completed.

10. The method of claim 1, wherein the device to-be-charged further comprises the battery, the battery is a single-cell battery or a multi-cell battery, and the multi-cell battery comprises a plurality of cells coupled in series, the method further comprising:

performing buck conversion on an output voltage of the multi-cell battery during power supply of the multi-cell battery.

11. The method of claim 10, further comprising:

during wireless charging, charging the battery through a plurality of charging stages when the charging voltage of the battery reaches a preset cut-off voltage, wherein each of the plurality of charging stages corresponds to one charging current; for two adjacent charging stages, a charging current corresponding to a former charging stage is larger than that corresponding to a latter charging stage; and in each of the plurality of charging stages, a charging current corresponding to the charging stage is applied for charging until a voltage across the battery reaches a limiting voltage, wherein the limiting voltage is higher than the preset cut-off voltage of the battery; and applying the limiting voltage to the battery for constant-voltage charging until the charging current of the battery reaches a target cut-off current of constant-voltage charging or a charging duration reaches a preset duration, and ending charging.

12. A wireless charging method, being applicable to a power supply device comprising a voltage adjusting circuit, and the method comprising:

receiving an adjustment request from a device to-be-charged during wireless charging, wherein the adjustment request carries at least one of a target charging power and a target charging current;

in response to the adjustment request, adjusting an output voltage of the voltage adjusting circuit according to the at least one of the target charging power and the target charging current; and controlling, according to the output voltage of the voltage adjusting circuit, a wireless charging apparatus to send to the device to-be-charged an adjusted wireless charging signal, such that an output of the wireless charging apparatus matches the at least one of the target charging power and the target charging current;

wherein the power supply device is configured to power the wireless charging apparatus, and the wireless charging apparatus is configured to charge the device to-be-charged.

13. The method of claim 12, wherein the adjustment request further comprises a present charging power and a power difference.

14. The method of claim 13, further comprising:

after receiving the adjustment request from the device to-be-charged, adjusting the output voltage of the voltage adjusting circuit according to the at least one of the target charging power and the target charging current, the present charging power, and the power difference.

15. A device to-be-charged, comprising:

a battery;

a detecting circuit configured to detect, during wireless charging, an output current of a wireless power receiving circuit and at least one of a charging voltage of the battery and a charging current of the battery;

a first processor configured to determine a target charging power according to the at least one of the charging voltage and the charging current of the battery, and determine a target charging current according to the output current of the wireless power receiving circuit;

a first wireless communication circuit configured to send an adjustment request to a power supply device, wherein the adjustment request carries at least one of the target charging power and the target charging current; and a wireless power receiving circuit configured to receive from a wireless charging apparatus an adjusted wireless charging signal, and perform wireless charging according to the adjusted wireless charging signal;

wherein the power supply device is configured to power the wireless charging apparatus, and the wireless charging apparatus is configured to charge the device to-be-charged.

16. The device to-be-charged of claim 15, wherein the first processor is further configured to:
after determining the target charging power according to the at least one of the charging voltage and the charging current of the battery;
determine a present charging power according to the at least one of the charging voltage and the charging current of the battery; and
determine a power difference according to the target charging power and the present charging power.

17. The device to-be-charged of claim 16, wherein the adjustment request further carries the present charging power and the power difference.

18. The device to-be-charged of claim 15, wherein the detecting circuit is further configured to:
detect a charging status.

19. The device to-be-charged of claim 18, wherein:
the first processor is configured to, when the charging status is constant-current charging, obtain a preset threshold current corresponding to the charging status, and determine the target charging power according to the preset threshold current and the charging voltage of the battery; and
the first processor is further configured to, when the charging status is constant-voltage charging, obtain a preset threshold voltage corresponding to the charging status, and determine the target charging power according to the preset threshold voltage and the charging current of the battery.

20. The device to-be-charged of claim 19, wherein:
the wireless power receiving circuit is configured to output a target output current and a target output voltage according to the adjusted wireless charging signal; and
the device to-be-charged further comprises:
a charging management module configured to convert the target output current and the target output voltage, and charge the battery.

* * * * *